US008070597B2

(12) United States Patent
Cuddy

(10) Patent No.: US 8,070,597 B2
(45) Date of Patent: Dec. 6, 2011

(54) GAMING DEVICE AND METHOD HAVING MULTIPLE PROGRESSIVE AWARD LEVELS AND A SECONDARY GAME FOR ADVANCING THROUGH THE PROGRESSIVE AWARD LEVELS

(75) Inventor: Ryan W. Cuddy, Reno, NV (US)

(73) Assignee: IGT, Reno, NV (US)

( * ) Notice: Subject to any disclaimer, the term of this patent is extended or adjusted under 35 U.S.C. 154(b) by 1525 days.

(21) Appl. No.: 11/462,285

(22) Filed: Aug. 3, 2006

(65) Prior Publication Data

US 2008/0039191 A1 Feb. 14, 2008

(51) Int. Cl.
*A63F 9/24* (2006.01)
*A63F 13/00* (2006.01)

(52) U.S. Cl. ................ 463/27; 463/16; 463/17; 463/18; 463/19; 463/20; 463/26

(58) Field of Classification Search .............. 463/16–20, 463/26–27
See application file for complete search history.

(56) References Cited

U.S. PATENT DOCUMENTS

| | | | |
|---|---|---|---|
| 1,978,395 | A | 10/1934 | Groetchen |
| 2,942,574 | A | 6/1960 | Golay |
| 3,420,525 | A | 1/1969 | Waders |
| 3,618,019 | A | 11/1971 | Nemirovsky |
| 3,642,287 | A | 2/1972 | Lally et al. |
| 3,735,987 | A | 5/1973 | Ohki |
| 3,998,309 | A | 12/1976 | Mandas et al. |
| 4,072,930 | A | 2/1978 | Lucero et al. |
| 4,198,052 | A | 4/1980 | Gauselmann |
| 4,238,127 | A | 12/1980 | Lucero et al. |
| 4,277,064 | A | 7/1981 | Newman |
| 4,283,709 | A | 8/1981 | Lucero et al. |
| 4,335,809 | A | 6/1982 | Wain |
| 4,409,656 | A | 10/1983 | Andersen et al. |
| 4,410,178 | A | 10/1983 | Partridge |
| 4,448,419 | A | 5/1984 | Telnaes |
| 4,494,197 | A | 1/1985 | Troy et al. |

(Continued)

FOREIGN PATENT DOCUMENTS

| | | |
|---|---|---|
| AU | 524709 | 9/1982 |

(Continued)

OTHER PUBLICATIONS

Aristrocrat Brochure, written by Aristocrat Gaming, published in 2004.

(Continued)

*Primary Examiner* — Peter DungBa Vo
*Assistant Examiner* — Jasson Yoo
(74) *Attorney, Agent, or Firm* — K&L Gates LLP

(57) ABSTRACT

A gaming system including a central server linked to a plurality of gaming machines. The gaming system includes a plurality of different types of progressive awards adapted to be provided to one or more players of the gaming machines in the gaming system. In one embodiment, one or more progressive awards are each associated with an outcome of a primary game, such as a designated symbol combination, wherein if the associated primary game outcome is generated, such progressive award is provided to a player. In one embodiment, one or more progressive awards are each associated with a progressive hit value, wherein when each progressive award increments to its respective progressive hit value, a triggering event occurs, such progressive award is provided to a player and the player is provided the opportunity to one or more additional progressive awards.

61 Claims, 13 Drawing Sheets

U.S. PATENT DOCUMENTS 4,560,161 A 12/1985 Hamano
4,573,681 A 3/1986 Okada
4,582,324 A 4/1986 Koza et al.
4,621,814 A 11/1986 Stepan et al.
4,624,459 A 11/1986 Kaufman
4,636,951 A 1/1987 Harlick
4,652,998 A 3/1987 Koza et al.
4,669,731 A 6/1987 Clarke
4,695,053 A 9/1987 Vazquez, Jr. et al.
4,721,307 A 1/1988 Okada
4,743,024 A 5/1988 Helm et al.
4,756,531 A 7/1988 DiRe et al.
4,760,527 A 7/1988 Sidley
4,775,155 A 10/1988 Lees
4,805,907 A 2/1989 Hagiwara
4,836,546 A 6/1989 DiRe et al.
4,837,728 A 6/1989 Barrie et al.
4,838,552 A 6/1989 Hagiwara
4,842,278 A 6/1989 Markowicz
4,856,787 A 8/1989 Itkis
4,871,171 A 10/1989 Rivero
4,880,237 A 11/1989 Kishishita
4,926,327 A 5/1990 Sidley
4,964,638 A 10/1990 Ishida
4,991,848 A 2/1991 Greenwood et al.
5,019,973 A 5/1991 Wilcox et al.
5,033,744 A 7/1991 Bridgeman et al.
5,038,022 A 8/1991 Lucero
5,048,833 A 9/1991 Lamle
5,074,559 A 12/1991 Okada
5,116,055 A 5/1992 Tracy
5,123,649 A 6/1992 Tiberio
5,127,651 A 7/1992 Okada
5,152,529 A 10/1992 Okada
5,158,293 A 10/1992 Mullins
5,178,390 A 1/1993 Okada
5,205,555 A 4/1993 Hamano
5,209,479 A 5/1993 Nagao
5,217,224 A 6/1993 Sincock
5,249,800 A 10/1993 Hilgendorf et al.
5,259,616 A 11/1993 Bergmann
5,265,874 A 11/1993 Dickinson et al.
5,275,400 A 1/1994 Weingardt
5,276,312 A 1/1994 McCarthy
5,277,424 A 1/1994 Wilms
5,280,909 A 1/1994 Tracy
5,286,023 A 2/1994 Wood
5,292,127 A 3/1994 Kelly et al.
5,308,065 A 5/1994 Bridgeman et al.
5,321,241 A 6/1994 Craine
5,324,035 A 6/1994 Morris et al.
5,326,104 A 7/1994 Pease et al.
5,332,228 A 7/1994 Schultz
5,342,047 A 8/1994 Heidel et al.
5,342,049 A 8/1994 Wichinsky et al.
5,344,144 A 9/1994 Canon
5,351,970 A 10/1994 Fioretti
5,364,100 A 11/1994 Ludlow et al.
5,377,993 A 1/1995 Josephs
5,393,057 A 2/1995 Marnell, II
5,393,061 A 2/1995 Manship et al.
5,395,111 A 3/1995 Inoue
5,398,932 A 3/1995 Eberhardt et al.
5,401,024 A 3/1995 Simunek
5,407,200 A 4/1995 Zalabak
5,417,430 A 5/1995 Breeding
5,423,539 A 6/1995 Nagao
5,429,361 A 7/1995 Raven et al.
5,431,408 A 7/1995 Adams
5,449,173 A 9/1995 Thomas et al.
5,456,465 A 10/1995 Durham
5,470,079 A 11/1995 LeStrange et al.
5,472,194 A 12/1995 Breeding et al.
5,476,259 A 12/1995 Weingardt
5,489,101 A 2/1996 Moody
5,511,781 A 4/1996 Wood
5,524,888 A 6/1996 Heidel
5,531,441 A 7/1996 Dabrowski et al.
5,536,016 A 7/1996 Thompson
5,542,669 A 8/1996 Charron et al.
5,544,893 A 8/1996 Jones et al.
5,547,192 A 8/1996 Ishibashi
5,560,603 A 10/1996 Seelig et al.
5,564,700 A 10/1996 Celona
5,566,337 A 10/1996 Szymanski
5,570,885 A 11/1996 Ornstein
5,580,053 A 12/1996 Crouch
5,580,309 A 12/1996 Piechowiak et al.
5,581,011 A 12/1996 D'Ambra
5,584,485 A 12/1996 Jone et al.
5,584,763 A 12/1996 Kelly et al.
5,584,764 A 12/1996 Inoue
5,601,487 A 2/1997 Oshima
5,605,506 A 2/1997 Hoorn et al.
5,609,524 A 3/1997 Inoue
5,611,535 A 3/1997 Tiberio
5,611,730 A 3/1997 Weiss
5,626,341 A 5/1997 Jones
5,641,050 A 6/1997 Smith et al.
5,645,486 A 7/1997 Nagao et al.
5,647,798 A 7/1997 Falciglia
5,655,961 A 8/1997 Acres et al.
5,674,128 A 10/1997 Holch et al.
5,702,304 A 12/1997 Acres et al.
5,707,285 A 1/1998 Place et al.
5,707,286 A 1/1998 Carlson
5,711,525 A 1/1998 Breeding
5,722,891 A 3/1998 Inoue
5,732,948 A 3/1998 Yoseloff
5,741,183 A 4/1998 Acres et al.
5,743,800 A 4/1998 Huard et al.
5,752,881 A 5/1998 Inoue
5,752,882 A 5/1998 Acres et al.
5,761,647 A 6/1998 Boushy
5,762,552 A 6/1998 Vuong
5,766,076 A 6/1998 Pease et al.
5,769,716 A 6/1998 Saffari et al.
5,772,506 A 6/1998 Marks et al.
5,772,509 A 6/1998 Weiss
5,772,511 A 6/1998 Smeltzer
RE35,864 E 7/1998 Weingardt
5,775,692 A 7/1998 Watts et al.
5,779,544 A 7/1998 Seelig et al.
5,779,545 A 7/1998 Berg et al.
5,779,547 A 7/1998 SoRelle et al.
5,779,549 A 7/1998 Walker et al.
5,788,573 A 8/1998 Baerlocher et al.
5,800,269 A 9/1998 Holch et al.
5,806,855 A 9/1998 Cherry
5,807,172 A 9/1998 Piechowiak
5,816,918 A 10/1998 Kelly et al.
5,820,459 A 10/1998 Acres et al.
5,823,873 A 10/1998 Moody
5,823,874 A 10/1998 Adams
5,833,537 A 11/1998 Barrie
5,833,538 A 11/1998 Weiss
5,833,540 A 11/1998 Miodunski et al.
5,836,817 A 11/1998 Acres et al.
5,848,932 A 12/1998 Adams
5,851,148 A 12/1998 Brune et al.
5,851,149 A 12/1998 Xidos et al.
5,855,514 A 1/1999 Kamille
5,855,515 A 1/1999 Pease et al.
5,863,249 A 1/1999 Inoue
5,873,781 A 2/1999 Keane
5,876,284 A 3/1999 Acres et al.
5,882,261 A 3/1999 Adams
5,885,158 A 3/1999 Torango et al.
5,902,184 A 5/1999 Bennett
5,902,983 A 5/1999 Crevelt et al.
5,910,048 A 6/1999 Feinberg
5,911,418 A 6/1999 Adams
5,919,088 A 7/1999 Weiss
5,934,672 A 8/1999 Sines et al.
5,935,002 A 8/1999 Falciglia
5,941,773 A 8/1999 Harlick
5,944,606 A 8/1999 Gerow

| | | | |
|---|---|---|---|
| 5,947,820 | A | 9/1999 | Morro et al. |
| 5,947,822 | A | 9/1999 | Weiss |
| 5,951,011 | A | 9/1999 | Potter et al. |
| 5,951,397 | A | 9/1999 | Dickinson |
| 5,964,463 | A | 10/1999 | Moore, Jr. |
| 5,967,894 | A | 10/1999 | Kinoshita et al. |
| 5,976,015 | A | 11/1999 | Seelig et al. |
| 5,980,384 | A | 11/1999 | Barrie |
| 5,984,779 | A | 11/1999 | Bridgeman et al. |
| 5,984,781 | A | 11/1999 | Sunaga |
| 5,989,121 | A | 11/1999 | Sakamoto |
| 5,993,316 | A | 11/1999 | Coyle et al. |
| 5,997,400 | A | 12/1999 | Seelig et al. |
| 5,997,401 | A | 12/1999 | Crawford |
| 6,001,016 | A | 12/1999 | Walker et al. |
| 6,004,207 | A | 12/1999 | Wilson, Jr. et al. |
| 6,007,427 | A | 12/1999 | Wiener et al. |
| 6,012,982 | A | 1/2000 | Piechowiak et al. |
| 6,015,346 | A | 1/2000 | Bennett |
| 6,019,369 | A | 2/2000 | Nakagawa et al. |
| 6,033,307 | A | 3/2000 | Vancura |
| 6,039,648 | A | 3/2000 | Guinn et al. |
| 6,039,649 | A | 3/2000 | Schulze |
| 6,048,269 | A | 4/2000 | Burns et al. |
| 6,050,895 | A | 4/2000 | Luciano et al. |
| 6,056,642 | A | 5/2000 | Bennett |
| 6,059,289 | A | 5/2000 | Vancura |
| 6,059,658 | A | 5/2000 | Mangano et al. |
| 6,062,979 | A | 5/2000 | Inoue |
| 6,062,980 | A | 5/2000 | Luciano |
| 6,068,553 | A | 5/2000 | Parker |
| 6,077,162 | A | 6/2000 | Weiss |
| 6,080,062 | A | 6/2000 | Olson |
| 6,086,066 | A | 7/2000 | Takeuchi et al. |
| 6,089,976 | A | 7/2000 | Schneider et al. |
| 6,089,977 | A | 7/2000 | Bennett |
| 6,089,978 | A | 7/2000 | Adams |
| 6,089,980 | A | 7/2000 | Gauselmann |
| 6,093,102 | A | 7/2000 | Bennett |
| 6,099,408 | A | 8/2000 | Schneier et al. |
| 6,102,400 | A | 8/2000 | Scott et al. |
| 6,102,798 | A | 8/2000 | Bennett |
| 6,105,962 | A | 8/2000 | Malavazos et al. |
| 6,110,041 | A | 8/2000 | Walker et al. |
| 6,110,043 | A | 8/2000 | Olsen |
| 6,113,098 | A | 9/2000 | Adams |
| 6,117,009 | A | 9/2000 | Yoseloff |
| 6,117,013 | A | 9/2000 | Eiba |
| 6,120,031 | A | 9/2000 | Adams |
| 6,120,378 | A | 9/2000 | Moody et al. |
| 6,126,541 | A | 10/2000 | Fuchs |
| 6,126,542 | A | 10/2000 | Fier |
| 6,129,355 | A | 10/2000 | Hahn et al. |
| 6,135,884 | A | 10/2000 | Hedrick et al. |
| 6,135,885 | A | 10/2000 | Lermusiaux |
| 6,142,872 | A | 11/2000 | Walker et al. |
| 6,142,873 | A | 11/2000 | Weiss et al. |
| 6,142,874 | A | 11/2000 | Kodachi et al. |
| 6,142,875 | A | 11/2000 | Kodachi et al. |
| 6,146,273 | A | 11/2000 | Olsen |
| 6,149,156 | A | 11/2000 | Feola |
| 6,149,157 | A | 11/2000 | Suan |
| 6,149,521 | A | 11/2000 | Sanduski |
| 6,152,823 | A | 11/2000 | Lacoste et al. |
| 6,155,925 | A | 12/2000 | Giobbi et al. |
| 6,159,095 | A | 12/2000 | Frohm et al. |
| 6,159,097 | A | 12/2000 | Gura |
| 6,159,098 | A | 12/2000 | Slomiany et al. |
| 6,162,121 | A | 12/2000 | Morro et al. |
| 6,162,122 | A | 12/2000 | Acres et al. |
| 6,168,520 | B1 | 1/2001 | Baerlocher et al. |
| 6,168,523 | B1 | 1/2001 | Piechowiak et al. |
| 6,173,955 | B1 | 1/2001 | Perrie et al. |
| 6,174,233 | B1 | 1/2001 | Sunaga et al. |
| 6,174,235 | B1 | 1/2001 | Walker et al. |
| 6,183,366 | B1 | 2/2001 | Goldberg et al. |
| 6,186,894 | B1 | 2/2001 | Mayeroff |
| 6,190,254 | B1 | 2/2001 | Bennett |
| 6,190,255 | B1 | 2/2001 | Thomas et al. |
| 6,203,010 | B1 | 3/2001 | Jorasch et al. |
| 6,203,429 | B1 | 3/2001 | Demar et al. |
| 6,203,430 | B1 | 3/2001 | Walker et al. |
| 6,206,374 | B1 | 3/2001 | Jones |
| 6,210,275 | B1 | 4/2001 | Olsen |
| 6,210,277 | B1 | 4/2001 | Stefan |
| 6,210,279 | B1 | 4/2001 | Dickinson |
| 6,213,876 | B1 | 4/2001 | Moore, Jr. |
| 6,217,448 | B1 | 4/2001 | Olsen |
| 6,220,959 | B1 | 4/2001 | Holmes, Jr. et al. |
| 6,224,482 | B1 | 5/2001 | Bennett |
| 6,224,483 | B1 | 5/2001 | Mayeroff |
| 6,224,484 | B1 | 5/2001 | Okuda et al. |
| 6,227,971 | B1 | 5/2001 | Weiss |
| 6,231,442 | B1 | 5/2001 | Mayeroff |
| 6,231,445 | B1 | 5/2001 | Acres |
| 6,234,879 | B1 | 5/2001 | Hasegawa et al. |
| 6,234,897 | B1 | 5/2001 | Frohm et al. |
| 6,238,287 | B1 | 5/2001 | Komori et al. |
| 6,238,288 | B1 | 5/2001 | Walker et al. |
| 6,241,608 | B1 | 6/2001 | Torango |
| 6,244,958 | B1 | 6/2001 | Acres |
| 6,251,013 | B1 | 6/2001 | Bennett |
| 6,254,483 | B1 | 7/2001 | Acres |
| 6,257,981 | B1 | 7/2001 | Acres et al. |
| 6,261,128 | B1 | 7/2001 | Heim et al. |
| 6,261,177 | B1 | 7/2001 | Bennett |
| 6,264,557 | B1 | 7/2001 | Schneier et al. |
| 6,270,409 | B1 | 8/2001 | Shuster |
| 6,270,412 | B1 | 8/2001 | Crawford et al. |
| 6,287,202 | B1 | 9/2001 | Pascal et al. |
| 6,293,866 | B1 | 9/2001 | Walker et al. |
| RE37,414 | E | 10/2001 | Harlick |
| 6,299,165 | B1 | 10/2001 | Nagano |
| 6,299,170 | B1 | 10/2001 | Yoseloff |
| 6,302,398 | B1 | 10/2001 | Vecchio |
| 6,302,790 | B1 | 10/2001 | Brossard |
| 6,302,793 | B1 | 10/2001 | Fertitta, III et al. |
| 6,305,686 | B1 | 10/2001 | Perrie et al. |
| 6,309,298 | B1 | 10/2001 | Gerow |
| 6,309,299 | B1 | 10/2001 | Weiss |
| 6,309,300 | B1 | 10/2001 | Glavich |
| 6,311,976 | B1 | 11/2001 | Yoseloff et al. |
| 6,312,330 | B1 | 11/2001 | Jones et al. |
| 6,312,333 | B1 | 11/2001 | Acres |
| 6,312,334 | B1 | 11/2001 | Yoseloff |
| 6,315,662 | B1 | 11/2001 | Jorasch et al. |
| 6,315,663 | B1 | 11/2001 | Sakamoto |
| 6,315,664 | B1 | 11/2001 | Baerlocher et al. |
| 6,319,122 | B1 | 11/2001 | Packes, Jr. et al. |
| 6,319,124 | B1 | 11/2001 | Baerlocher et al. |
| 6,319,125 | B1 | 11/2001 | Acres |
| 6,322,078 | B1 | 11/2001 | Adams |
| 6,322,309 | B1 | 11/2001 | Thomas et al. |
| 6,328,649 | B1 | 12/2001 | Randall et al. |
| 6,334,814 | B1 | 1/2002 | Adams |
| 6,336,857 | B1 | 1/2002 | McBride |
| 6,336,860 | B1 | 1/2002 | Webb |
| 6,336,863 | B1 | 1/2002 | Baerlocher et al. |
| 6,340,158 | B2 | 1/2002 | Preice et al. |
| 6,346,043 | B1 | 2/2002 | Colin et al. |
| 6,347,738 | B1 | 2/2002 | Crevelt et al. |
| 6,347,996 | B1 | 2/2002 | Gilmore et al. |
| 6,358,144 | B1 | 3/2002 | Kadlic et al. |
| 6,358,149 | B1 | 3/2002 | Schneider et al. |
| 6,361,441 | B1 | 3/2002 | Walker et al. |
| 6,364,766 | B1 | 4/2002 | Anderson et al. |
| 6,364,767 | B1 | 4/2002 | Brossard et al. |
| 6,364,768 | B1 | 4/2002 | Acres et al. |
| 6,364,769 | B1 | 4/2002 | Weiss et al. |
| 6,368,216 | B1 | 4/2002 | Hedrick et al. |
| 6,371,852 | B1 | 4/2002 | Acres |
| 6,375,187 | B1 | 4/2002 | Baerlocher |
| 6,375,567 | B1 | 4/2002 | Acres |
| 6,375,568 | B1 | 4/2002 | Roffman et al. |
| 6,375,569 | B1 | 4/2002 | Acres |
| 6,375,570 | B1 | 4/2002 | Poole |
| 6,398,218 | B1 | 6/2002 | Vancura |
| 6,398,220 | B1 | 6/2002 | Inoue |

| | | | |
|---|---|---|---|
| 6,398,644 | B1 | 6/2002 | Perrie et al. |
| 6,406,369 | B1 | 6/2002 | Baerlocher et al. |
| 6,409,602 | B1 | 6/2002 | Wiltshire et al. |
| 6,413,160 | B1 | 7/2002 | Vancura |
| 6,416,408 | B2 | 7/2002 | Tracy et al. |
| 6,416,409 | B1 | 7/2002 | Jordan |
| 6,419,579 | B1 | 7/2002 | Bennett |
| 6,419,583 | B1 | 7/2002 | Crumby et al. |
| 6,428,412 | B1 | 8/2002 | Anderson et al. |
| 6,431,983 | B2 | 8/2002 | Acres |
| 6,435,511 | B1 | 8/2002 | Vancura et al. |
| 6,435,968 | B1 | 8/2002 | Torango |
| 6,439,993 | B1 | 8/2002 | O'Halloran |
| 6,439,995 | B1 | 8/2002 | Hughs-Baird et al. |
| 6,443,452 | B1 | 9/2002 | Brune |
| 6,443,837 | B1 | 9/2002 | Jaffe et al. |
| 6,454,266 | B1 | 9/2002 | Breeding et al. |
| 6,454,651 | B1 | 9/2002 | Yoseloff |
| RE37,885 | E | 10/2002 | Acres et al. |
| 6,461,241 | B1 | 10/2002 | Webb et al. |
| 6,471,208 | B2 | 10/2002 | Yoseloff et al. |
| 6,481,713 | B2 | 11/2002 | Perrie et al. |
| 6,491,584 | B2 | 12/2002 | Graham et al. |
| 6,494,454 | B2 | 12/2002 | Adams |
| 6,506,118 | B1 | 1/2003 | Baerlocher et al. |
| 6,511,376 | B2 | 1/2003 | Walker et al. |
| 6,514,141 | B1 | 2/2003 | Kaminkow et al. |
| 6,533,273 | B2 | 3/2003 | Cole et al. |
| 6,533,664 | B1 | 3/2003 | Crumby |
| 6,537,150 | B1 | 3/2003 | Luciano et al. |
| 6,546,134 | B1 | 4/2003 | Shrairman et al. |
| 6,546,374 | B1 | 4/2003 | Esposito et al. |
| 6,547,131 | B1 | 4/2003 | Foodman et al. |
| 6,554,705 | B1 | 4/2003 | Cumbers |
| 6,561,904 | B2 | 5/2003 | Locke et al. |
| 6,565,434 | B1 | 5/2003 | Acres |
| 6,565,436 | B1 | 5/2003 | Baerlocher |
| 6,569,015 | B1 | 5/2003 | Baerlocher et al. |
| 6,572,471 | B1 | 6/2003 | Bennett |
| 6,575,830 | B2 | 6/2003 | Baerlocher et al. |
| 6,575,832 | B1 | 6/2003 | Manfredi et al. |
| 6,589,115 | B2 | 7/2003 | Walker et al. |
| 6,592,460 | B2 | 7/2003 | Torango |
| 6,595,853 | B1 | 7/2003 | Osawa |
| 6,595,854 | B2 | 7/2003 | Hughs-Baird et al. |
| 6,599,190 | B2 | 7/2003 | Osawa |
| 6,599,193 | B2 | 7/2003 | Baerlocher et al. |
| 6,604,740 | B1 | 8/2003 | Singer et al. |
| 6,607,441 | B1 | 8/2003 | Acres |
| 6,609,972 | B2 | 8/2003 | Seelig et al. |
| 6,609,973 | B1 | 8/2003 | Weiss |
| 6,616,142 | B2 | 9/2003 | Adams |
| 6,616,531 | B1 | 9/2003 | Mullins |
| 6,620,046 | B2 | 9/2003 | Rowe |
| 6,626,758 | B1 | 9/2003 | Parham et al. |
| 6,634,944 | B2 | 10/2003 | Osawa |
| 6,637,747 | B1 | 10/2003 | Garrod |
| 6,645,077 | B2 | 11/2003 | Rowe |
| 6,648,759 | B2 | 11/2003 | Vancura |
| 6,656,047 | B1 | 12/2003 | Tarantino et al. |
| 6,656,048 | B2 | 12/2003 | Olsen |
| 6,656,052 | B2 | 12/2003 | Abramopoulos et al. |
| 6,659,864 | B2 | 12/2003 | McGahn et al. |
| 6,672,959 | B2 | 1/2004 | Moody et al. |
| 6,675,152 | B1 | 1/2004 | Prasad et al. |
| 6,692,355 | B2 | 2/2004 | Baerlocher et al. |
| 6,712,695 | B2 | 3/2004 | Mothwurf et al. |
| 6,712,697 | B2 | 3/2004 | Acres |
| 6,719,630 | B1 | 4/2004 | Seelig et al. |
| 6,726,204 | B2 | 4/2004 | Inoue |
| 6,746,328 | B2 | 6/2004 | Cannon et al. |
| 6,749,510 | B2 | 6/2004 | Giobbi |
| 6,754,346 | B2 | 6/2004 | Eiserling et al. |
| 6,761,632 | B2 | 7/2004 | Nolz et al. |
| 6,776,714 | B2 | 8/2004 | Ungaro et al. |
| 6,776,715 | B2 | 8/2004 | Price |
| 6,790,141 | B2 | 9/2004 | Muir |
| 6,800,030 | B2 | 10/2004 | Acres |
| 6,805,352 | B2 | 10/2004 | Hunter |
| 6,811,483 | B1 | 11/2004 | Webb et al. |
| 6,832,956 | B1 | 12/2004 | Boyd et al. |
| 6,832,958 | B2 | 12/2004 | Acres et al. |
| 6,837,788 | B2 | 1/2005 | Cannon |
| 6,866,583 | B2 | 3/2005 | Glavich et al. |
| 6,869,361 | B2 | 3/2005 | Sharpless et al. |
| 6,887,154 | B1 | 5/2005 | Luciano, Jr. et al. |
| 6,889,849 | B2 | 5/2005 | Heidel et al. |
| 6,899,625 | B2 | 5/2005 | Luciano, Jr. et al. |
| 6,908,387 | B2 | 6/2005 | Hedrick et al. |
| 6,910,964 | B2 | 6/2005 | Acres |
| 6,913,532 | B2 | 7/2005 | Baerlocher et al. |
| 6,918,832 | B2 | 7/2005 | Baerlocher et al. |
| 6,918,834 | B2 | 7/2005 | Vancura |
| 6,935,951 | B2 | 8/2005 | Paulsen et al. |
| 6,935,958 | B2 | 8/2005 | Nelson |
| 6,939,234 | B2 | 9/2005 | Beatty |
| 6,942,574 | B1 | 9/2005 | LeMay et al. |
| RE38,812 | E | 10/2005 | Acres et al. |
| 6,955,600 | B2 | 10/2005 | Glavich et al. |
| 6,966,834 | B1 | 11/2005 | Johnson |
| 7,029,395 | B1 | 4/2006 | Baerlocher |
| 7,291,068 | B2 | 11/2007 | Bryant et al. |
| 7,371,171 | B1 | 5/2008 | Englman et al. |
| 2001/0024971 | A1 | 9/2001 | Brossard |
| 2001/0049303 | A1 | 12/2001 | Found |
| 2001/0055990 | A1 | 12/2001 | Acres |
| 2002/0002674 | A1 | 1/2002 | Grimes et al. |
| 2002/0071557 | A1 | 6/2002 | Nguyen |
| 2002/0116615 | A1 | 8/2002 | Nguyen et al. |
| 2002/0138594 | A1 | 9/2002 | Rowe |
| 2002/0142829 | A1 | 10/2002 | Inoue |
| 2002/0152120 | A1 | 10/2002 | Howington |
| 2002/0155880 | A1 | 10/2002 | Glavich et al. |
| 2002/0165023 | A1 | 11/2002 | Brosnan et al. |
| 2002/0187834 | A1 | 12/2002 | Rowe et al. |
| 2003/0027625 | A1 | 2/2003 | Rowe |
| 2003/0027630 | A1 | 2/2003 | Kelly et al. |
| 2003/0028779 | A1 | 2/2003 | Rowe |
| 2003/0040355 | A1 | 2/2003 | Baerlocher |
| 2003/0045350 | A1 | 3/2003 | Baerlocher et al. |
| 2003/0045353 | A1 | 3/2003 | Paulsen et al. |
| 2003/0050111 | A1 | 3/2003 | Saffari |
| 2003/0054875 | A1 | 3/2003 | Marks et al. |
| 2003/0054878 | A1 | 3/2003 | Benoy et al. |
| 2003/0060266 | A1 | 3/2003 | Baerlocher |
| 2003/0060267 | A1 | 3/2003 | Glavich et al. |
| 2003/0060269 | A1 | 3/2003 | Paulsen et al. |
| 2003/0060272 | A1 | 3/2003 | Glavich et al. |
| 2003/0060279 | A1 | 3/2003 | Torango |
| 2003/0064773 | A1 | 4/2003 | Baerlocher et al. |
| 2003/0069056 | A1 | 4/2003 | Cormack et al. |
| 2003/0073482 | A1 | 4/2003 | Baerlocher et al. |
| 2003/0083943 | A1 | 5/2003 | Adams et al. |
| 2003/0092484 | A1 | 5/2003 | Schneider et al. |
| 2003/0144965 | A1 | 7/2003 | Prasad et al. |
| 2003/0162585 | A1 | 8/2003 | Bigelow et al. |
| 2003/0182574 | A1 | 9/2003 | Whitten et al. |
| 2003/0199321 | A1 | 10/2003 | Williams |
| 2003/0211879 | A1 | 11/2003 | Englman |
| 2003/0222402 | A1 | 12/2003 | Olive |
| 2003/0223803 | A1 | 12/2003 | De Schrijver |
| 2003/0228904 | A1 | 12/2003 | Acres et al. |
| 2003/0232643 | A1 | 12/2003 | Inoue |
| 2003/0232647 | A1 | 12/2003 | Moser |
| 2004/0002372 | A1 | 1/2004 | Rodgers et al. |
| 2004/0009811 | A1 | 1/2004 | Torango |
| 2004/0012145 | A1 | 1/2004 | Inoue |
| 2004/0014516 | A1 | 1/2004 | Inoue |
| 2004/0014517 | A1 | 1/2004 | Inoue |
| 2004/0018866 | A1 | 1/2004 | Inoue |
| 2004/0026854 | A1 | 2/2004 | Inoue |
| 2004/0036218 | A1 | 2/2004 | Inoue |
| 2004/0038726 | A1 | 2/2004 | Inoue |
| 2004/0041340 | A1 | 3/2004 | Inoue |
| 2004/0048649 | A1 | 3/2004 | Peterson et al. |
| 2004/0048652 | A1 | 3/2004 | Ching et al. |
| 2004/0053672 | A1 | 3/2004 | Baerlocher |
| 2004/0072615 | A1 | 4/2004 | Maya et al. |

| | | | |
|---|---|---|---|
| 2004/0087368 | A1 | 5/2004 | Gauselmann |
| 2004/0137982 | A1 | 7/2004 | Cuddy et al. |
| 2004/0147306 | A1 | 7/2004 | Randall et al. |
| 2004/0214631 | A1* | 10/2004 | Devaull ........................... 463/20 |
| 2004/0235552 | A1 | 11/2004 | Gauselmann |
| 2004/0242297 | A1 | 12/2004 | Walker |
| 2005/0026694 | A1 | 2/2005 | Kelly et al. |
| 2005/0032573 | A1 | 2/2005 | Acres et al. |
| 2005/0049040 | A1* | 3/2005 | Roberts ........................... 463/25 |
| 2005/0053672 | A1 | 3/2005 | West |
| 2005/0054429 | A1 | 3/2005 | Baerlocher et al. |
| 2005/0070356 | A1 | 3/2005 | Mothwurf |
| 2005/0075163 | A1 | 4/2005 | Cuddy et al. |
| 2005/0079908 | A1 | 4/2005 | Pacey |
| 2005/0079911 | A1 | 4/2005 | Nakatsu |
| 2005/0086478 | A1 | 4/2005 | Peinado et al. |
| 2005/0101374 | A1 | 5/2005 | Acres |
| 2005/0101375 | A1 | 5/2005 | Webb et al. |
| 2005/0101384 | A1 | 5/2005 | Parham |
| 2005/0119047 | A1 | 6/2005 | Olive |
| 2005/0143168 | A1 | 6/2005 | Torango |
| 2005/0143169 | A1 | 6/2005 | Nguyen et al. |
| 2005/0159211 | A1 | 7/2005 | Englman |
| 2005/0163377 | A1 | 7/2005 | Walch |
| 2005/0176488 | A1 | 8/2005 | Olive |
| 2005/0178716 | A1 | 8/2005 | Suri |
| 2005/0192083 | A1 | 9/2005 | Iwamoto |
| 2005/0192099 | A1 | 9/2005 | Nguyen et al. |
| 2005/0197180 | A1 | 9/2005 | Kaminkow et al. |
| 2005/0209004 | A1 | 9/2005 | Torango |
| 2005/0239542 | A1* | 10/2005 | Olsen .............................. 463/27 |
| 2005/0267610 | A1 | 12/2005 | Shinoda |
| 2005/0282626 | A1 | 12/2005 | Manfredi et al. |
| 2006/0003829 | A1 | 1/2006 | Thomas |
| 2006/0009285 | A1 | 1/2006 | Pryzby et al. |
| 2006/0025201 | A1 | 2/2006 | Van Asdale |
| 2006/0025210 | A1 | 2/2006 | Johnson |
| 2006/0026604 | A1 | 2/2006 | Tan et al. |
| 2006/0030397 | A1 | 2/2006 | Chan |
| 2006/0035694 | A1 | 2/2006 | Fuller |
| 2006/0035706 | A1 | 2/2006 | Thomas et al. |
| 2006/0036552 | A1 | 2/2006 | Gunyakti et al. |
| 2006/0040732 | A1 | 2/2006 | Baerlocher et al. |
| 2006/0052159 | A1 | 3/2006 | Cahill et al. |
| 2006/0052161 | A1 | 3/2006 | Soukup et al. |
| 2006/0052162 | A1 | 3/2006 | Soukup et al. |
| 2006/0068897 | A1 | 3/2006 | Sanford et al. |
| 2006/0073879 | A1 | 4/2006 | Baerlocher |
| 2006/0073889 | A1 | 4/2006 | Edidin et al. |
| 2006/0073897 | A1 | 4/2006 | Englman et al. |
| 2006/0178203 | A1 | 8/2006 | Hughes et al. |
| 2007/0060319 | A1 | 3/2007 | Block et al. |
| 2009/0131159 | A1* | 5/2009 | Englman et al. ................ 463/27 |

FOREIGN PATENT DOCUMENTS

| | | | |
|---|---|---|---|
| AU | 555905 | | 10/1986 |
| AU | 567001 | | 11/1987 |
| AU | 585160 | | 6/1989 |
| AU | 589158 | | 10/1989 |
| AU | 593059 | | 2/1990 |
| AU | 630112 | | 3/1990 |
| AU | 628330 | | 9/1992 |
| AU | 633469 | | 1/1993 |
| AU | 649009 | | 5/1994 |
| AU | 655801 | | 1/1995 |
| AU | 1996 70247 | | 4/1997 |
| AU | 680920 | | 8/1997 |
| AU | 1997 16432 | | 9/1997 |
| AU | 1997 17601 | B2 | 9/1997 |
| AU | 1996 50327 | A | 10/1997 |
| AU | 1997 47657 | B2 | 6/1998 |
| AU | 1998 63553 | A | 10/1998 |
| AU | 1998 84162 | A1 | 3/1999 |
| AU | 707687 | | 7/1999 |
| AU | 1999 17318 | A1 | 9/1999 |
| AU | 709724 | | 9/1999 |
| AU | 711501 | | 10/1999 |
| AU | 716299 | | 2/2000 |
| AU | 721968 | | 7/2000 |
| AU | 722107 | | 7/2000 |
| AU | 728788 | | 1/2001 |
| AU | 2001 1000032 | B4 | 11/2001 |
| AU | 2001 1000033 | B4 | 11/2001 |
| AU | 748263 | | 5/2002 |
| AU | 749222 | | 6/2002 |
| AU | 754689 | | 11/2002 |
| AU | 758306 | | 3/2003 |
| AU | 1999 43453 | C | 4/2003 |
| DE | 3415114 | | 11/1985 |
| DE | 3638100 | | 11/1988 |
| DE | 3917683 | | 12/1990 |
| DE | 4200254 | | 8/1993 |
| DE | 4301855 | | 7/1994 |
| DE | 196134 55 | | 8/1997 |
| DE | 19936196 | | 1/2001 |
| DE | 37008861 | A1 | 8/2004 |
| EP | 0 342 797 | | 11/1989 |
| EP | 0 444 932 | | 2/1991 |
| EP | 0 798 676 | A1 | 10/1997 |
| EP | 0 874 337 | A1 | 10/1998 |
| EP | 0 926 645 | A2 | 6/1999 |
| EP | 0 944 030 | A2 | 9/1999 |
| EP | 0 945 837 | A2 | 9/1999 |
| EP | 0 981 119 | A2 | 2/2000 |
| EP | 0 984 408 | A2 | 3/2000 |
| EP | 1 467 329 | A2 | 10/2004 |
| EP | 1 498 860 | A1 | 1/2005 |
| EP | 1 513 114 | A2 | 3/2005 |
| EP | 1 528 516 | A2 | 5/2005 |
| EP | 1 528 517 | A2 | 5/2005 |
| GB | 2 083 936 | A | 3/1982 |
| GB | 2 096 376 | A | 10/1982 |
| GB | 2 097 160 | A | 10/1982 |
| GB | 2 117 155 | A | 10/1983 |
| GB | 2 118 445 | | 11/1983 |
| GB | 2 137 392 | A | 10/1984 |
| GB | 2 139 390 | | 11/1984 |
| GB | 2 147 773 | | 5/1985 |
| GB | 2 148 135 | | 5/1985 |
| GB | 1 151 054 | A | 7/1985 |
| GB | 2 153 572 | A | 8/1985 |
| GB | 2 170 636 | A | 8/1986 |
| GB | 2 183 882 | A | 6/1987 |
| GB | 2 226 436 | A | 6/1990 |
| GB | 2 231 189 | | 11/1990 |
| GB | 2 282 690 | | 4/1995 |
| GB | 2 328 311 | | 2/1999 |
| GB | 2 353 128 | A | 2/2001 |
| GB | 2 387 703 | | 10/2003 |
| JP | 7148307 | | 6/1995 |
| WO | WO 94 12256 | | 6/1994 |
| WO | WO 95 22811 | | 8/1995 |
| WO | WO 95 30944 | | 11/1995 |
| WO | WO 97 12338 | | 4/1997 |
| WO | WO 97 27568 | | 7/1997 |
| WO | WO 97 32285 | | 9/1997 |
| WO | WO 98 35309 | | 8/1998 |
| WO | WO 98 47115 | | 10/1998 |
| WO | WO 98 51384 | | 11/1998 |
| WO | WO 99 03078 | | 1/1999 |
| WO | WO 99 10849 | | 3/1999 |
| WO | WO 00 12186 | | 3/2000 |
| WO | WO 00 32286 | | 6/2000 |
| WO | WO 00 66235 | | 11/2000 |
| WO | WO 00 76606 | | 12/2000 |
| WO | WO 01 10523 | | 2/2001 |
| WO | WO 01 15055 | | 3/2001 |
| WO | WO 01 15790 | A1 | 3/2001 |
| WO | WO 01 26019 | | 4/2001 |
| WO | WO 03 030066 | | 4/2003 |
| WO | WO 03 075235 | | 9/2003 |
| WO | WO 2004 035161 | | 4/2004 |
| WO | WO 2004 066061 | A2 | 8/2004 |
| WO | WO 2005 027058 | | 3/2005 |
| WO | WO 2005 076193 | | 8/2005 |
| WO | WO 2005 081623 | A2 | 9/2005 |
| WO | WO 2005 083599 | A1 | 9/2005 |
| WO | WO 2005 099425 | A2 | 10/2005 |

| | | | |
|---|---|---|---|
| WO | WO 2005 099845 A1 | 10/2005 |
| WO | WO 2005 106702 | 11/2005 |
| WO | WO 2005 113093 | 12/2005 |
| WO | WO 2006/014770 | 2/2006 |
| WO | WO 2006/014883 | 2/2006 |
| WO | WO 2006/014990 | 2/2006 |
| WO | WO 2006/039366 | 4/2006 |

OTHER PUBLICATIONS

Atronic Systems Progressive Products at G2E, published by Atronic in 2004, printed from ForRelease.com.
Bally Slot Machines Electro-Mechanicals 1964-1980 Book [in Part], Revised 3rd Edition written by Marshall Fey.
Cartoon Jackpots description, printed from www.ballygaming.com/home.asp, on Feb. 4, 2005.
Cash Express Advertisements, written by Aristocrat, published in 2002.
Cashing In Article, written by Strictly Slots, published in Aug. 2006.
Double Spin Five Times Pay Advertisement, written by IGT, published prior to 2000.
FAST BUCK Systems Manual, written by International Game Technology, available to Mirage shift supervisors at least as early as May 30, 1990.
Hot Shot Progressive Article, written by Strictly Slots, published in Feb. 2006.
Jackpot Carnival Hyperlink Advertisement, written by Aristocrat, published prior to 2002.
Lemons, Cherries and Bell-Fruit-Gum, pp. 1 to 4 and 304 to 314, written by Bueschel, published in Royal Bell Books in Nov. 1995.
Mikohn Product Catalog, Chapters 1, 2, 6, 7 and 8, written by Mikohn, published in Jan. 1993.
Mikohn Supper Controller Manual, Chapters 1 to 3 and 6 to 7, written by Mikohn, published in 1989.
Millioni$er articles, written by Strictly Slots, published in Sep. 2003 and Mar. 2004.
Money Time advertisement, written by Mikohn Gaming, published in 1999.
M-Slot Series Primary Reel Product description from Lemons, Cherries and Bell-Fruit-Gum, written by Richard M. Bueschel, published in 1995.
PEM—Precision Electronic Meter, written by GRIPS Electronic GmbH, printed from website reported as archived on Feb. 20, 1997 (available at http://web.archive.org/web/19970220165753/www.grips.com/pem.htm).
Penguin Pucks article, written by Note in Gaming Marketplace, published prior to 2004.
Player Tracking on Slots, written by GRIPS Electronic GmbH, printed from website reported as archived on Feb. 20, 1997 (available at http://web.archive.org/web/19970220165921/www.grips.com/playtrac.htm).
Progressive Jackpot System article, printed from casinomagazine.com.managearticle.asp@c_290&a=518, on Jun. 21, 2004.
ProLINK Progressive Controller User/Reference Manual, written by Casino Data Systems, published in Apr. 1997.
Slot Line Progressive Advertisement, written by IGT, published in 1993.
Slot Line Progressive Advertisement, written by IGT, published in 1994.
Slot Line Progressive Advertisement, written by IGT, published in 1995.
Slot Line Progressive Mega Jackpots Advertisement, written by IGT, published in 1997.
Slot Line Temperature Rising Game Description, written by IGT, published in 1998.
Slot Machines a Pictorial History of the First 100 Years (pp. 216, 242 to 243), 5th edition, written by Marshall Fey, published in 1983-1997.
Surprize Gaming Machine Advertisement, written by Aristocrat Leisure Industries, Australia, published prior to 2004.
Surprize Software Specification for MV2030—var 01, written by Aristocrat Leisure Industries, Australia, published prior to 2004.
Wide Area Progressive Link System, written by GRIPS Electronic GmbH, printed from website reported as archived on Feb. 20, 1997 (available at http://web.archive.org/web/19970220165457/www.grips.com/wap.htm).
Zorro Advertisement, written by Aristocrat, published in 2004.
"Letter from Mr. McClarnon regarding disclosure of U.S. Patent No. 6,409,602; dated Aug. 3, 2008."

* cited by examiner

GAMING DEVICE AND METHOD HAVING MULTIPLE PROGRESSIVE AWARD LEVELS AND A SECONDARY GAME FOR ADVANCING THROUGH THE PROGRESSIVE AWARD LEVELS

CROSS REFERENCE TO RELATED APPLICATIONS

This application relates to the following co-pending commonly owned patent applications: "GAMING DEVICE HAVING GAME WITH SYMBOLS AND ADJACENTLY DISPLAYED COMPLIMENTARY SUB-SYMBOLS," Ser. No. 11/558,304,"GAMING DEVICE HAVING A GAME WITH PRIMARY SYMBOLS, SECONDARY SYMBOLS ASSOCIATED WITH THE PRIMARY SYMBOLS AND INDEPENDENTLY GENERATED SECONDARY SYMBOLS," Ser. No. 10/957,013, and "GAMING DEVICE HAVING RESULTANT WILD SYMBOLS," Ser. No. 11/149,706.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Symbols or symbol combinations which are less likely to occur usually provide higher awards.

In such known gaming machines, the amount of the wager made on the base game by the player may vary. For instance, the gaming machine may enable the player to wager a minimum number of credits, such as one credit (e.g., one penny, nickel, dime, quarter or dollar) up to a maximum number of credits, such as five credits. This wager may be made by the player a single time or multiple times in a single play of the primary game. For instance, a slot game may have one or more paylines and the slot game may enable the player to make a wager on each payline in a single play of the primary game. Thus, it is known that a gaming machine, such as a slot game, may enable players to make wagers of substantially different amounts on each play of the primary or base game ranging, for example, from 1 credit up to 125 credits (e.g., 5 credits on each of 25 separate paylines). This is also true for other wagering games, such as video draw poker, where players can wager one or more credits on each hand and where multiple hands can be played simultaneously. Accordingly, it should be appreciated that different players play at substantially different wagering amounts or levels and at substantially different rates of play.

Secondary or bonus games are also known in gaming machines. The secondary or bonus games usually provide an additional award to the player. Secondary or bonus games usually do not require an additional wager by the player to be activated. Secondary or bonus games are generally activated or triggered upon an occurrence of a designated triggering symbol or triggering symbol combination in the primary or base game. For instance, a bonus symbol occurring on the payline on the third reel of a three reel slot machine may trigger the secondary bonus game. Part of the enjoyment and excitement of playing certain gaming machines is the occurrence or triggering of the secondary or bonus game (even before the player knows how much the bonus award will be). In other words, obtaining a bonus event and a bonus award in the bonus event is part of the enjoyment and excitement for players.

One such secondary or bonus game provides a player one or more free spin sequences. In these gaming devices, upon an occurrence of a triggering event in the primary game, the gaming device temporarily halts the primary game play and enables a player to enter a free spin mode or sequence wherein one or more free spins are provided to the player. The player plays the free spin mode or sequence, likely receives an award during one or more of the free spins and returns to the base game. Free spin mode or sequences that provide players with large awards or the potential to win large awards are attractive to players.

Progressive awards associated with gaming machines are also known. A progressive award is an award amount which includes an initial amount funded by a casino and an additional amount funded through a portion of each wager made on the progressive gaming machine. For example, 0.1% of each wager placed on the primary game of the gaming machine associated with the progressive award may be allocated to the progressive award or progressive award fund or pool. The progressive award grows in value as more players play the gaming machines and more portions of these players' wagers are allocated to the progressive award. When a player obtains a winning symbol or symbol combination associated with the progressive award, the accumulated progressive award is provided to the player. After the progressive award is provided to the player, the amount of the next progressive award is reset to the initial value and a portion of each subsequent wager on a gaming machine associated with a progressive award is allocated to the next progressive award.

A progressive award may be associated with or otherwise dedicated to a single or stand-alone gaming machine. Alternatively, a progressive award may be associated with or otherwise dedicated to multiple gaming machines which each contribute a portion of wagers placed at such gaming machine (s) to the progressive award. The multiple gaming machines may be in the same bank of gaming machines, in the same casino or gaming establishment (usually through a local area network ("LAN")) or in two or more different casinos or gaming establishments (usually through a wide area network ("WAN")). Such progressive awards are played for by one or more gaming devices in the same gaming establishment sometimes called local area progressives ("LAP") and such progressive awards played for by a plurality of gaming devices at a plurality of different gaming establishments are sometimes called wide area progressives ("WAP").

Moreover, a gaming machine or bank of gaming machines may be simultaneously associated with a plurality of progressive awards. In these multi-level progressive ("MLP") configurations, a plurality of progressive awards start at different award or value levels, such as $10, $100, $1000 and $10,000 and each individually increment or increase until provided to a player. Upon a suitable triggering event at one of more of the gaming devices associated with the MLP, one or more of the progressive awards which form the MLP are provided to one or more of the players at such gaming devices.

Mystery bonus awards are also known. For instance, U.S. Pat. Nos. 5,655,961, 5,702,304, 5,741,183, 5,752,882, 5,820,459, 5,836,817, 5,876,284, 6,162,122, 6,257,981, 6,319,125, 6,364,768, 6,375,569, 6,375,567, RE37,885 and U.S. Pat. No. 6,565,434 describe mystery bonus awards and certain methods for providing such awards to players. These patents also describe certain methods for determining which gaming machines will provide the awards to players. These patents further describe methods for a central server to determine which gaming machines will provide the bonus awards and the amount of the bonus awards.

PCT Application No. PCT/AU98/00525, entitled "Slot Machine Game And System With Improved Jackpot Feature" discloses a jackpot awardable to a plurality of gaming machines connected to a network. Upon each play of each gaming machine, a jackpot controller increments the value of the jackpot. Prior to each primary game, the gaming machine selects a random number from a range of numbers and during each primary game, the gaming machine allocates a plurality of numbers in the range, where the plurality of numbers is proportional to the wager. At the end of the primary game, the randomly selected number is compared with the numbers allocated to the player and if a match occurs, that particular gaming machine is switched into a feature game mode in which a jackpot game is played for all or part of the incremental jackpot.

PCT Application No. PCT/AU99/01059, entitled "Player Information Delivery" discloses a gaming console in which an animated character occasionally randomly appears and awards a player a variable random bonus prize. The occurrence of the animated character is weighted by the desired hit rate of the feature and is dependent upon the player's bet and may or may not be dependent upon the size and type of the player's bet. Additionally, the gaming console includes a bonus pool (funded by the player) and a random decision is made whether the contents of the bonus pool will be awarded in addition to any other win.

U.S. Pat. No. 6,241,608 B1 entitled "Progressive Wagering System" discloses a linked progressive wagering system specifying a boundary criteria, such as a maximum value or an expiration date and time, for a progressive award prize. If a gaming device has not randomly generated a prize award event when the specified boundary criteria is met, a progressive award prize is forced by the system upon one or more randomly selected participating players.

While such mystery progressive awards are popular amongst players, a number of problems exist with these known mystery progressive award systems. First, only one person wins the progressive award. This may discourage the other players who have also been playing for a long period of time. Such discouragement can lead to players walking away with jackpot fatigue. Jackpot fatigue can occur when a player no longer finds an award desirable or worth the cost of continuing to play. This desire to quit playing is also due to the fact that a player may feel they must wait a substantial period of time for the jackpot to climb back to a high value. That is, when a progressive award is provided at a different gaming machine, a player may feel deflated and not wish to continue playing for a base or reset level progressive award.

Additionally, because the mathematics and funding required to maintain the mystery progressive awards at levels desirable to the player, such mystery progressive awards are often won or hit infrequently.

There is a continuing need to provide new and different gaming machines and gaming systems as well as new and different ways to provide awards to players including bonus awards.

SUMMARY

In one embodiment, the gaming device and gaming system disclosed herein includes at least one and preferably a plurality of progressive awards or progressive incremented values adapted to be provided to a player. In one embodiment, at least one of the progressive awards is provided to a player based on the occurrence of at least one of a plurality of different events. For example, if a first type of triggering event or qualifying condition occurs, such as the generation of a designated symbol combination, the player is provided a designated progressive award. In this example, if a second type of triggering event or qualifying condition occurs, such as the accumulation of a designated number of points in a secondary game, the player is still provided the designed progressive award. That is, a single progressive award may be provided to a player based on the independent occurrence of a single one of a plurality of different types of triggering events of qualifying conditions. Providing a player a progressive award based on the occurrence of at least one of a plurality of different types of triggering events increases the level of player interest in the gaming device and gaming system disclosed herein because even if a first way to win a progressive award does not result in the player winning that progressive award, the player is provided a second way to win that same progressive award.

In one embodiment, a plurality of the progressive awards are different types of progressive awards, which may be independent from each other. In one embodiment, the different progressive awards are provided to the players based on different triggering events or qualifying conditions or criteria. Since the different progressive awards are provided from different triggering events, a player may obtain a plurality of different progressive awards based on a single play of the game. Accordingly, providing a gaming device with a plurality of different triggering events for a plurality of different progressive awards significantly increases the probability that at least one progressive award will be viewed as desirable to the player and will be available at any time, thus increasing the level of player interest in the gaming device and gaming system disclosed herein.

In one embodiment, at least one of the progressive awards is provided to a player based on a plurality of different events occurring. For example, a first progressive award is provided to a player if a first event occurs in a primary game or alternatively if a second event occurs in a secondary game. In this example, a second progressive award is provided to the player if a third event occurs or if the second event occurs in the secondary game. In one such embodiment, at least one progressive award is provided to a player based on a first triggering event associated with a primary game and at least a second progressive award is provided to a player based on a second triggering event associated with that progressive award incrementing to at least a designated level. In this embodiment, if the second progressive awards increments to the designated level, one or more of such progressive awards may be additionally provided to a player based on the results of a secondary game. That is, if a triggering event associated with a certain type of progressive award occurs, then not only is the player provided the triggered progressive award, but the player is also provided at least one opportunity to win one or more additional types of progressive awards.

In one embodiment, the gaming device disclosed herein includes or is otherwise associated with a plurality of different types of progressive awards and/or independent progressive awards. In one embodiment, the different types of progressive awards are provided to the player based on the occurrences of different independent triggering events. In one embodiment, one or more progressive awards are each associated with an outcome of a play of a primary game, such as a designated symbol combination, wherein if the associated primary game outcome is generated, such progressive award is provided to a player. In one embodiment, one or more progressive awards are provided based on such factors as when a designed amount of wagers are placed at one or more of the gaming devices of the gaming system. In this embodiment, when an accumulated value progressive award or $N^{th}$ coin progressive award increments to its respective progressive award hit value, a triggering event occurs and such accumulated value progressive award is provided to a player. In one embodiment, in addition to providing the player the accumulated value progressive award, the gaming device initiates a secondary game wherein the player is provided one or more opportunities to win one or more of the maintained progressive awards. In one such embodiment, which accumulated value progressive award is provided to the player (i.e., which accumulated value progressive award triggered the secondary game) determines which maintained progressive award(s) the player plays for and may obtain in the secondary game.

In one embodiment, one or more progressive awards are provided to a player based on a displayed event in a play of a primary game of the gaming device. In one such embodiment, the determination of when to provide such a progressive award is based on a symbol driven event, such as the generation of one or more designated symbols or symbol combinations in a play of the primary game. In this embodiment, since the chance of winning such a progressive award is randomly determined based on a probability calculation and the progressive award is funded by the player's bets, the amount which this progressive award may be incremented to is unlimited and thus may grow to large, desirable levels.

In one embodiment, a plurality of accumulated value progressive awards are each associated with a separate range of values. In this embodiment, when an accumulated value progressive award increments or increases to an accumulated value progressive award hit value within the range of values associated with that progressive award, the gaming device provides that accumulated value progressive award to a player. For example, a first accumulated value progressive award is associated with a value range of $10 to $100 and a second accumulated value progressive award is associated with a value range of $100 to $1,000. In this example, a triggering event will occur and the first accumulated value progressive award will be provided to a player when the value of the first accumulated value progressive award increments to a first accumulated value progressive award hit value of $54.65. In this example, another triggering event will occur and the second accumulated value progressive award will be provided to a player when the value of the second accumulated value progressive award increments to a second accumulated value progressive award hit value of $765.71. It should be appreciated that in this embodiment, the amount which each accumulated value progressive award may be incremented to is capped or limited by the highest value in the value range associated with such accumulated value progressive award. In an alternative embodiment, the gaming device utilizes an associated coin-in value to determine when the accumulated value progressive award has reached a set value. Such a coin-in value is determined in one embodiment by using the hit value, the percentage applied to the progressive and the wager value.

In one embodiment, the gaming device includes a plurality of accumulated value progressive awards in a multi-level progressive award configuration (sometimes referred to herein as an "MLP"). In this embodiment, if a triggering event associated with at least one of these progressive awards occurs (i.e., one of the accumulated value progressive awards increments to its respective accumulated value progressive award hit value), a secondary game is triggered. The triggered secondary game enables a player to win one or more progressive awards in addition to the progressive award which incremented to its respective accumulated value progressive award hit value. That is, a player is provided a chance to move up one or more progressive award levels of an MLP, wherein winning any additional progressive award levels is based on the outcome of the secondary game.

In one such embodiment, which progressive award incremented to its respective accumulated value progressive award hit value determines which additional progressive awards the player will pay for in the secondary game. For example, if the lowest progressive award level of the MLP incremented to its respective accumulated value progressive award hit value, then the player would be eligible to play for the progressive awards associated with each of the higher progressive award levels of the MLP as well as the progressive award associated with the symbol driven event of the primary game. In another example, if the progressive award associated with the second to highest progressive award level of the MLP incremented to its respective accumulated value progressive award hit value, then the player would be eligible to play for the progressive awards associated with the higher progressive award level of the MLP and the progressive award associated with the symbol driven event of the primary game.

In one embodiment, in addition to winning zero, one or more accumulated value progressive awards of the MLP configuration, during the play of the secondary game, the player may also win the progressive award associated with the primary game outcome. In this embodiment, if the player wins the progressive award associated with the highest progressive award level of the MLP (either during the secondary game or via the progressive award associated with the highest progressive award level of the MLP incrementing to its respective accumulated value progressive award hit value), the player plays the secondary game for a chance to win the symbol-driven progressive award described above. It should be appreciated that this embodiment enables a player to win different types of progressive awards either based on the occurrences of different triggering conditions or based on the play of a secondary game.

In one embodiment, the secondary game includes a free spin mode. In the free spin mode, the gaming device provides a player a number of free spins or free activations of one or more symbol generators, such as reels. In this embodiment, the plurality of symbol generators each include or are otherwise associated with a plurality of symbols. At least one and preferably a plurality of the symbols each include a secondary symbol, such as a sub-symbol. Each secondary symbol includes zero, one or more elements or characteristics, such as a number of points or values. As described below, the gaming device tracks or accumulates any generated secondary symbols and determines, based on the characteristics associated with the tracked or accumulated secondary symbols, whether to provide the player any additional progressive awards.

In one embodiment, one or more of the progressive awards are each associated with a number of secondary symbol characteristics, such as a number of points, which must be accumulated to provide the player that progressive award. For example, a first progressive award is associated with ten accumulated points and a second progressive award is associated with thirty accumulated points. In this example, if a player accumulates ten points during the free spin secondary game, the player is provided the first progressive award (in addition to any progressive award associated with triggering the secondary game) and if the player accumulates thirty points during the free spin secondary game, the player is provided the first progressive award (for the first ten accumulated points) and the second progressive award (in addition to any progressive award associated with triggering the secondary game).

In operation of this secondary game, for each provided free activation or free spin, the plurality of symbol generators each generate one or more symbols. The gaming device analyzes the generated symbols and determines if any of the generated symbols are associated with any secondary symbols. For each generated symbol which is associated with a secondary symbol, the gaming device tracks or accumulates the number of points associated with the generated secondary symbol. After each provided free spin, the gaming device determines whether the total number of accumulated points is equal to or greater than the number of accumulated points associated with one of the progressive awards. If the total number of accumulated points is equal to or greater than the number of accumulated points associated with one of the progressive awards, the gaming device provides the player that progressive award. For example, if a free spin resulted in twelve accumulated points, in addition to any progressive award previously provided to the player, the gaming device provides the player the first progressive award (which is associated with ten accumulated points).

If the total number of accumulated points is not equal to or greater than the number of accumulated points associated with one of the progressive awards, the gaming device determines if any free spins remain. If at least one free spin remains, the gaming device generates another plurality of symbols and proceeds as described above. If no free spins remain, the gaming device terminates the secondary game.

In one embodiment, one or more of the gaming devices disclosed herein are in communication with or linked to a central server or controller to form a gaming system. In one such embodiment, the gaming system includes a plurality of linked gaming machines wherein one of the gaming machines functions as the central server or controller. In one embodiment, one, more or each of the progressive awards are maintained by the central controller of the gaming system. In one such embodiment, the central controller enables a player at any gaming device in the gaming system to place a side bet or side wager on one or more of the progressive awards maintained by the central controller. In this embodiment, if the progressive award associated with the player's side bet or side wager is triggered, the central controller enables the player to participate in the secondary game to win one or more additional progressive awards as described above. In another embodiment, one, more or each of the progressive awards are maintained by the individual gaming devices. For example, the progressive award(s) provided upon a symbol driven event may be maintained by the central controller (and thus obtainable by any player at any gaming device in the gaming system) while the accumulated value progressive awards may be maintained by each individual gaming device (and thus obtainable by the player playing that individual gaming device). It should be appreciated that any suitable configuration of maintaining one, more or each of the progressive awards may be implemented in accordance with the gaming device and/or gaming system disclosed herein.

Accordingly, an advantage of the gaming device and gaming system disclosed herein is to include a plurality of progressive awards wherein in addition to the progressive award associated with the triggered event, the gaming device provides the player an opportunity to win one or more additional progressive awards in a secondary game. Such a configuration provides increased excitement and enjoyment for players because regardless of which progressive award they win, they are provided a chance to win one or more additional progressive awards.

Accordingly, another advantage of the gaming device and gaming system disclosed herein is to include a plurality of progressive awards which may be provided either sequentially, simultaneously or substantially simultaneously. Maintaining a plurality of progressive awards provides for more frequent wins of the progressive awards which breaks up the relatively long periods of time it often takes to build the progressive awards to the appropriate levels desirable by a player. Providing a plurality of different types of progressive awards which are triggered or hit at different times or based on different and/or independent triggering events results in always or almost always having at least one progressive award available that is incremented to desirable levels. Providing different types of progressive awards which have different frequencies of being hit therefore provides increased enjoyment and excitement for players.

Another advantage of the gaming device and gaming system disclosed herein is to include a plurality of progressive awards wherein one or more progressive awards require a designated wager level, such as a maximum wager to be eligible to win such progressive awards and one or more progressive awards do not require a designated wager level, such as a maximum wager to be eligible to win such progressive awards. Such a configuration appeals to both players who prefer to place the designated wager level, such as a maximum wager to win relatively larger, less frequently hit progressive awards and players who prefer not to place the designated wager level, such as a maximum wager but still want to win one or more relatively smaller, more frequently hit progressive awards.

Additional features and advantages are described in, and will be apparent from, the following Detailed Description and the figures.

DETAILED DESCRIPTION

The present disclosure may be implemented in various configurations for gaming machines or gaming devices, including but not limited to: (1) a dedicated gaming machine or gaming device, wherein the computerized instructions for controlling any games (which are provided by the gaming machine or gaming device) are provided with the gaming machine or gaming device prior to delivery to a gaming establishment; and (2) a changeable gaming machine or gaming device, where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by a central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
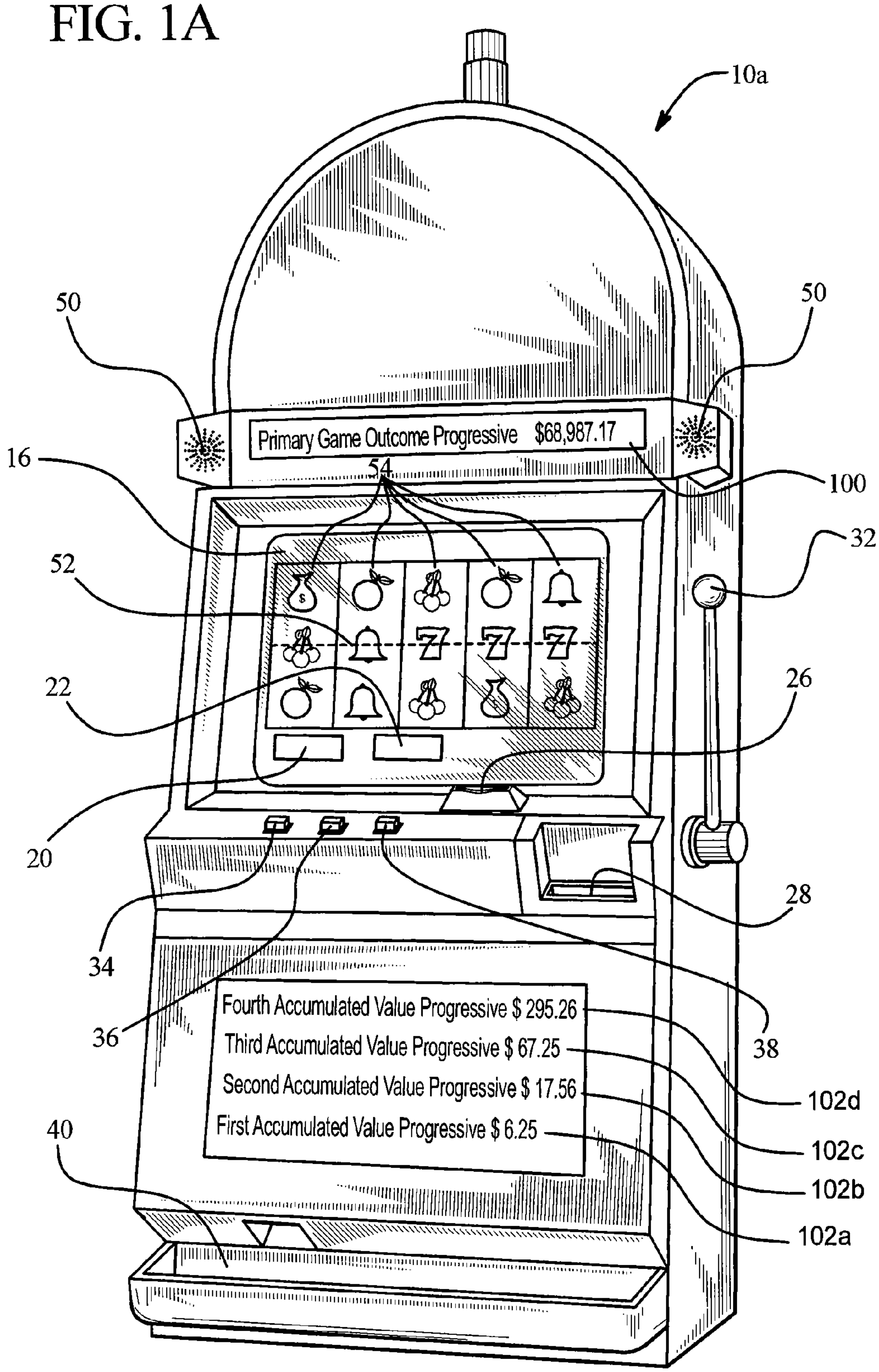
FIG. 1A is a front-side perspective view of one embodiment of the gaming device disclosed herein.
Figure 1B:
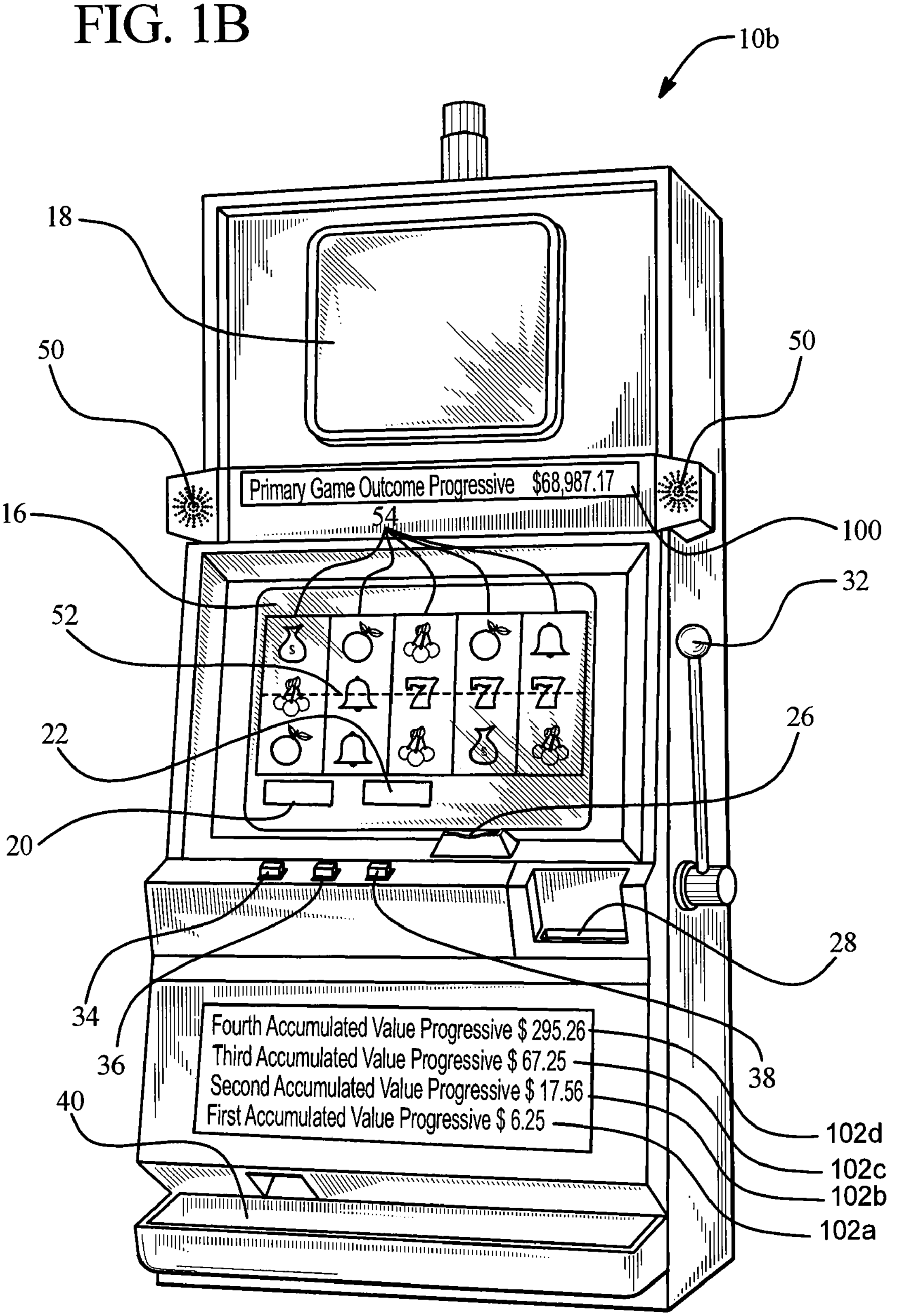
FIG. 1B is a front-side perspective view of another embodiment of the gaming device disclosed herein.

Referring now to the drawings, two example alternative embodiments of the gaming device of the disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
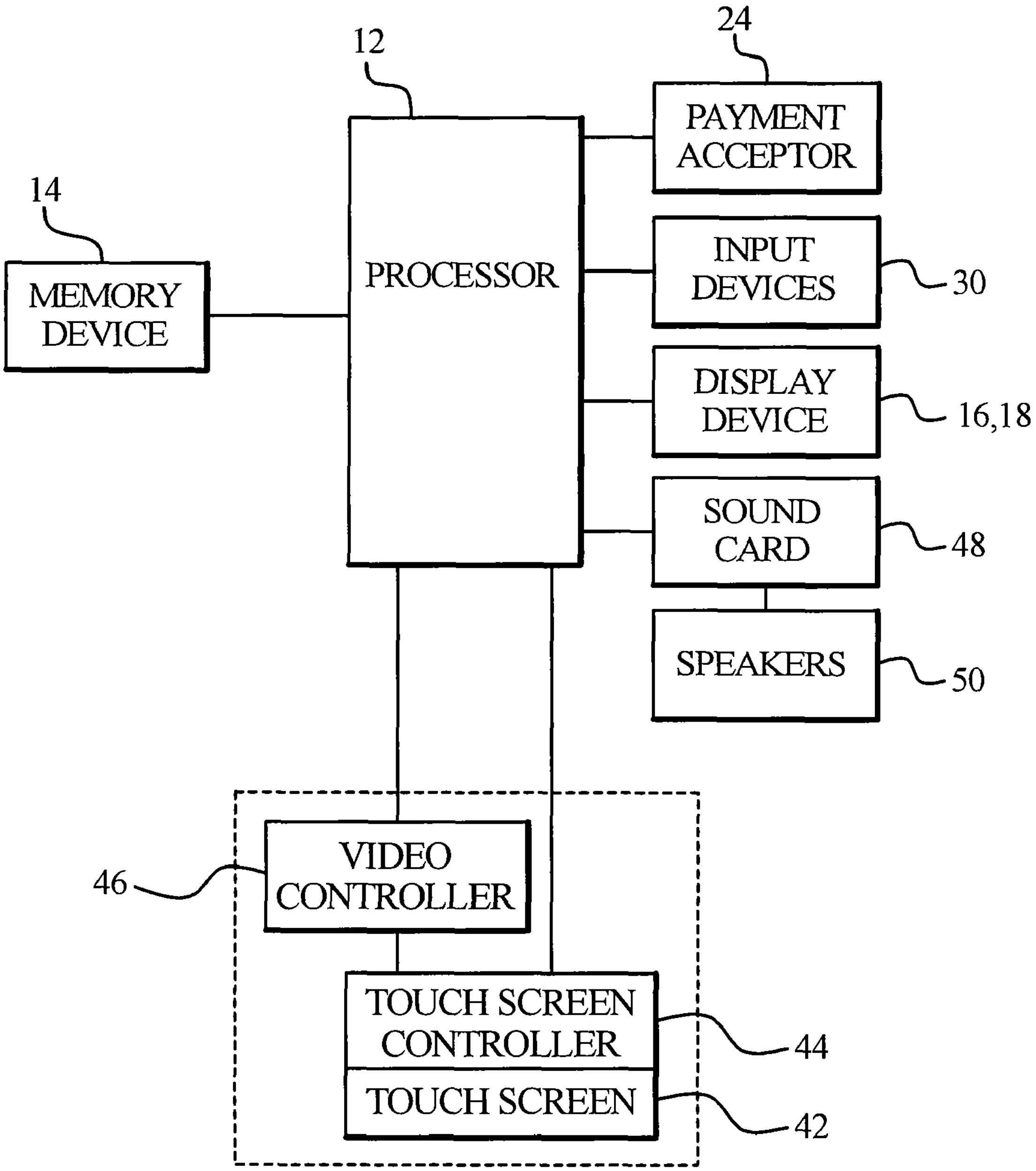
FIG. 2A is a schematic block diagram of the electronic configuration of one embodiment of the gaming device disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. As seen in FIGS. 1A and 1B, in one embodiment, the gaming device includes a credit display 20 which displays a player's current number of credits, cash, account balance or the equivalent. In one embodiment, gaming device includes a bet display 22 which displays a player's amount wagered.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one or a plurality of game or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, a ticket or voucher into the payment, note or bill acceptor. In other embodiments, devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier (or other suitable redemption system) or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places. One such input device is a touch-screen button panel. It should be appreciated that the utilization of touch-screens is widespread in the gaming industry.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering primary or base game. The gaming machine or device may include some or all of the features of conventional gaming machines or devices. The primary or base game may comprise any suitable reel-type game, card game, cascading or falling symbol game, number game or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, display the plurality of simulated video reels 54. Each reel 54 displays a plurality of indicia such as bells, hearts, fruits, numbers, letters, bars or other images which preferably correspond to a theme associated with the gaming device. In this embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on paylines that would have passed through that winning symbol combination). It should be appreciated that because a gaming device with wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one or a plurality of the selectable indicia or numbers via an input device such as the touch screen. The gaming device then displays a series of drawn numbers to determine an amount of matches, if any, between the player's selected numbers and the gaming device's drawn numbers. The player is provided an award based on the amount of matches, if any, based on the amount of determined matches.

In one embodiment, in addition to winning credits or other awards in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition may be by exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
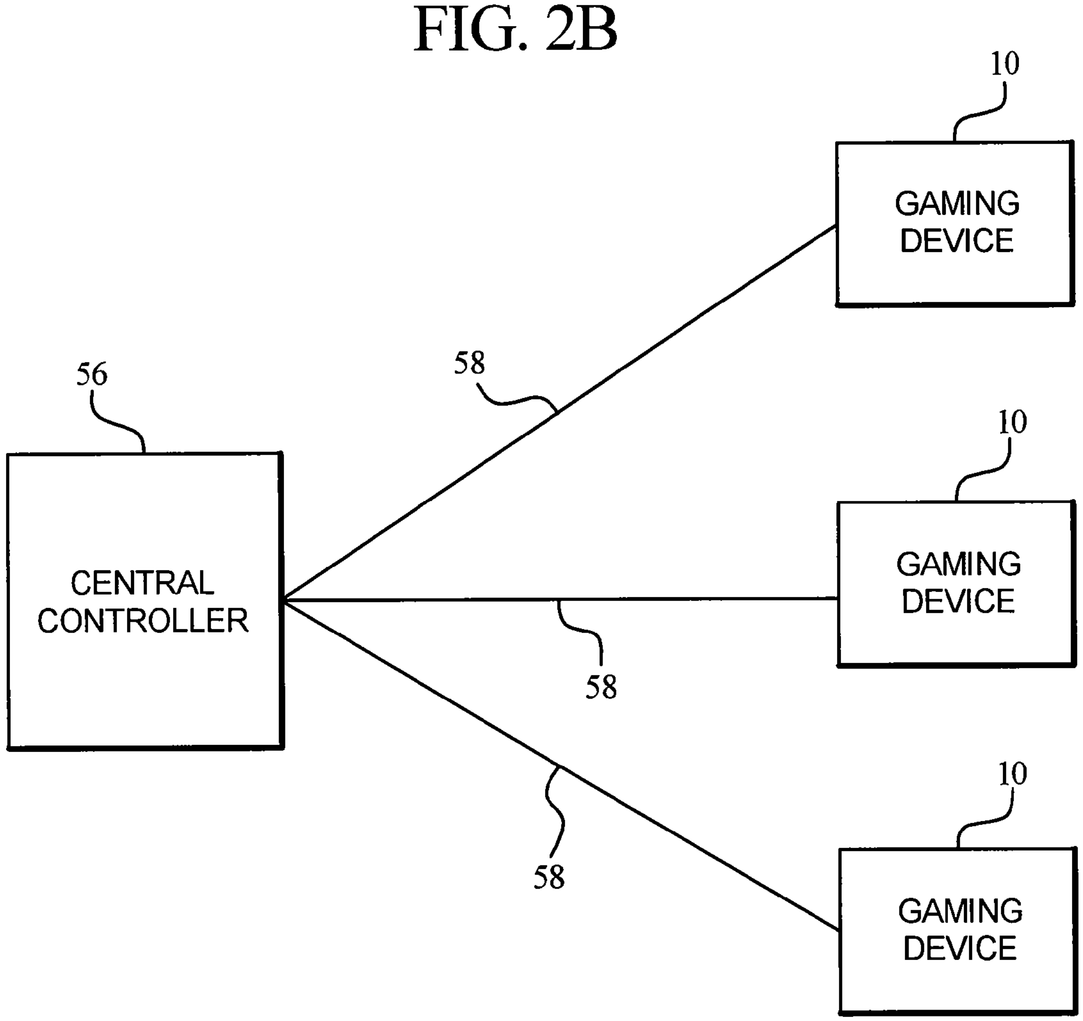
FIG. 2B is a schematic block diagram illustrating a plurality of gaming terminals in communication with a central controller.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo or keno game. In this embodiment, each individual gaming device utilizes one or more bingo or keno games to determine the predetermined game outcome value provided to the player for the interactive game played at that gaming device. In one embodiment, the bingo or keno game is displayed to the player. In another embodiment, the bingo or keno game is not displayed to the player, but the results of the bingo or keno game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment insures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. In this embodiment, the gaming device and/or player tracking system tracks any players gaming activity at the gaming device. In one such embodiment, the gaming device and/or associated player tracking system timely tracks when a player inserts their playing tracking card to begin a gaming session and also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internetlintranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of players at a plurality of linked gaming devices in a gaming system participate in a group gaming environment. In one embodiment, a plurality of players at a plurality of linked gaming devices work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Progressive Awards

In one embodiment, a plurality of gaming devices at one or more gaming sites are networked to the central server in a progressive configuration, wherein a portion of each wager placed is allocated to one or more progressive awards. In one embodiment, the progressive awards are associated with the system gaming machines which each contribute portions of the progressive awards. In one such embodiment, different progressive awards are associated with different numbers of gaming devices. For example, a progressive award valued at $10,000 may be associated with ten gaming devices while another progressive award valued at $500,000 may be associated with one-hundred gaming devices. In one embodiment, the multiple gaming machines may be in the same bank of machines, in the same casino or gaming establishment (such as through LAN), or in two or more different casinos or gaming establishments (such as through a WAN). In another embodiment, each individual gaming machine maintains one or more progressive awards wherein a portion of the wagers placed at that respective gaming machine is allocated to one or more progressive awards maintained by such individual gaming machine. In another embodiment, each individual gaming machine maintains one or more progressive awards and the central server simultaneously or substantially simultaneously maintains one or more progressive awards. In one such embodiment, the lower valued, more frequently triggered progressive awards are maintained by the individual gaming machines and the higher valued, less frequently triggered progressive awards are maintained by the central server. In one embodiment, a portion of each wager placed at a designated gaming device is allocated to one or more progressive awards associated with that designated gaming device. In another embodiment, a portion designated wagers placed at a designated gaming device, such as a portion of each maximum wager placed or a portion of each side wager placed, is allocated to one or more progressive awards associated with that designated gaming device.

In one embodiment, a master host site computer is coupled to a plurality of the central servers at a variety of mutually remote gaming sites for providing a multi-site linked progressive automated gaming system. In one embodiment, a master host site computer may serve gaming devices distributed throughout a number of properties at different geographical locations including, for example, different locations within a city or different cities within a state. In one embodiment, the master host site computer is maintained for the overall operation and control of the system. In this embodiment, a master host site computer oversees all or part of the progressive gaming system and is the master for computing all or part of the progressive jackpots. All participating gaming sites report to, and receive information from, the master host site computer. Each central server computer is responsible for all data communication between the gaming device hardware and software and the master host site computer.

In one embodiment, one or more of the progressive awards start at different levels such as $10, $100, $1000 and $10,000 and increment or increase until provided to a player. The progressive awards accumulate based on a small percentage (such as 0.1%) of coin-in or wagered amounts in a conventional manner. In one embodiment, the percentage that goes to each progressive award is equal (such as 0.1% to each of four progressive awards). At this accrual rate, player wagers totaling $1,000,000 are required for the progressive to reach $1000. At least a fraction of this amount may be funded by the casino by using a starting value higher than zero to make the progressives attractive even after they are reset. In other embodiments, two or more of the progressive awards may be funded by different percentages. In these embodiments, the central server and/or individual gaming device processor continues to increase the progressive levels until a progressive award is provided to a player (upon the occurrence of a progressive award triggering event), at which point the progressive is reset and another progressive award starts incrementing from the appropriate default progressive award level. In another embodiment, two or more of the progressive awards may be funded at different temporal rates. In this embodiment, the different progressive awards are incremented or funded in different increments of time wherein until the progressive hits, a set amount is added to the progressive at each determined time increment. In another embodiment, two or more of the progressive awards may each be incremented or funded based on different incrementing factors or incrementors. In this embodiment, a first of the progressive awards may increment each time a first incrementing factor occurs and a second of the progressive awards may increment each time a second incrementing factor occurs, wherein the first incrementing factor and the second incrementing factor are different. Examples of incrementing factors could be a symbol-driven trigger in the base game, the occurrence of one or more events in a bonus game, the player betting a maximum amount, a percentage of possible gaming machines being actively played or in active status, or any other suitable method for defining an incrementor.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount on any payline (i.e., the player need not place the maximum bet and the side bet to be eligible to win one of the progressive awards). In one such embodiment, the greater the player's wager (in addition to the placed side bet), the greater the odds or probability that the player will win one of the progressive awards. For example, if Player A wagers ten credits per payline (in addition to a side bet of two credits) and Player B wagers one credit per payline (in addition to a side bet of two credits), both players have a chance of winning the progressive award. However, in this example, Player A has a ten times greater chance of winning the progressive award than Player B. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming machine to qualify to be selected to obtain one of the progressive awards. In one embodiment, this minimum wager level is the maximum wager level for the primary game in the gaming machine. In another embodiment, this minimum wager level is placing a wager on all available paylines in a slot primary game or alternatively placing a wager on all available poker hands in a multi-hand poker primary game. In another embodiment, no minimum wager level is required for a gaming machine to qualify to be selected to obtain one of the progressive awards.

In another embodiment, one or more progressive awards are funded, at least partially, via an amount provided by one or more marketing and/or advertising departments, such as a casino's marketing department. In this embodiment, when a progressive award increments to the amount of money provided by the marketing or advertising department (or any other designated amount), the progressive award is triggered and provided to one or more players.

In one embodiment, the central server or other central controller determines when one or more progressive award wins are triggered. In this embodiment, a central controller and an individual gaming machine work in conjunction with each other to determine when a progressive award win is triggered, for example through an individual gaming machine meeting a predetermined requirement or criteria established by the central controller. In another embodiment, an individual gaming machine may determine when one or more progressive award wins are triggered. In another embodiment, an individual gaming machine may determine when at least one progressive award win is triggered and the central controller determines when at least one progressive award win is triggered.

In one embodiment, as described in more detail below, the gaming system includes a plurality of different types of progressive awards adapted to be provided to one or more players of the gaming machines in the gaming system. In one embodiment, the different types of progressive awards are provided to the player based on the occurrences of one or more different triggering or qualifying conditions or criteria. For example, at least one accumulated value progressive award is provided when such accumulated value progressive award increments to a certain predetermined amount, at least another progressive award is provided based on an outcome of a secondary game, and at least another progressive award is provided if a designated outcome is generated in a primary game. Such different triggering events for different progressive awards significantly increases the probability that at least one incremented progressive award will be available at any time as well as significantly increases the probability that, at any given time, the gaming system will be offering at least one progressive award that a player views as valuable or worth trying for. In one embodiment, the gaming devices of the gaming system are operable to provide multiple progressive awards to multiple players at the multiple linked gaming devices at the same time or substantially the same time. Alternatively, the gaming devices of the gaming system are operable to provide multiple progressive awards to multiple players at the multiple linked gaming devices in an overlapping or sequential manner.

In one embodiment, different gaming devices in the gaming system have different progressive awards available to the player. In one such embodiment, different types of gaming devices are associated with different types of progressive awards based on the current configuration of the gaming system. In one embodiment, zero, one or more progressive awards may be associated with each of the gaming devices in the gaming system while zero, one or more different progressive awards may be associated with a plurality of, but not all of the gaming devices in the gaming system. For example, both a first set of gaming devices and a second, different set of gaming devices may be associated with an symbol-driven progressive award, but the first set of gaming devices is also associated with an accumulated value progressive award (which the second set of gaming devices is not).

In one embodiment, one or more progressive awards maintained by the gaming system are associated with an outcome in the primary game. In one embodiment, the determination of when to provide such a progressive award is symbol driven based on the generation of one or more designated symbols or symbol combinations. In one embodiment, the designated symbols or symbol combinations have a specific probability and will be chosen by the game designer to create an equal chance for all player's who are linked into the system. This progressive award can grow to very large amounts because a game designer can set this winning symbol combination at a very small probability. One example of such a progressive is the MegaBuckS® progressive gaming system implemented by the assignee of this patent application.

In one embodiment, such game outcome progressive awards are maintained by the central controller and adapted to be provided to any of the gaming machines in the gaming system. In another embodiment, such game outcome progressive awards are maintained by each individual gaming machine and adapted to be provided to a player of that individual gaming machine. In another embodiment, one or more of such game outcome progressive awards are maintained by the central controller and one or more of such game outcome progressive awards are maintained by each individual gaming machine.

For example, as illustrated in FIGS. 1A and 1B, a primary game outcome progressive award 100 is associated with a designated symbol combination. In this example, when the designated symbol combination is randomly generated in the primary game, the primary game outcome progressive award is provided to a player. It should be appreciated that since the determination of when to provide this progressive award is based on a probability, the amount which this progressive award is incremented to is unlimited and thus may grow to large levels.

In another embodiment, each of the progressive awards of the gaming system disclosed herein are symbol-driven progressive awards. In this embodiment, if a symbol-driven triggering event occurs, such as the generation of designated symbol or symbol combination, one of the progressive awards is provided to a player and a secondary game is triggered. As described in more detail below, the secondary game provides a player the opportunity to win additional progressive awards. Accordingly, this embodiment provides that each of a plurality of symbol-driven progressive awards may be provided to the player via a first triggering event (i.e., the generation of a designated symbol or symbol combination) or a second, different triggering event (i.e., an event or occurrence associated with a play of the secondary game).

In one embodiment, as described above, a minimum wager level is required for a gaming machine to qualify to be selected to obtain this progressive award. In one such embodiment, this minimum wager level is the maximum wager level for the primary game in the gaming machine. Providing a gaming system wherein one or more progressive awards require a maximum wager to be eligible to win such progressive awards and one or more progressive awards do not require a maximum wager to be eligible to win such progressive awards appeals to both players who prefer to place the maximum wager to win relatively larger, less frequently hit progressive awards and players who prefer not to place the maximum wager but still want to win one or more relatively smaller, more frequently hit progressive awards.

In one embodiment, at least one and preferably a plurality of the progressive awards maintained by the gaming system are provided to players of the linked gaming machines in an apparently random fashion as perceived by the players of these gaming machines. These progressive awards are distinguished from the awards that the gaming machines provide to the players for winning outcomes in the plays of the primary wagering games, such as slot games, card games (e.g., poker, blackjack) or any other suitable game.

In one embodiment, the gaming devices do not provide any apparent reasons to the players for obtaining such progressive awards. In this embodiment, providing the progressive awards is not triggered by an event in the primary game or based specifically on any of the plays of any primary game or on any of the plays of any secondary game of the gaming machines in the system. That is, these progressive awards are provided to the players without any explanation or alternatively with simple explanations.

In one embodiment, the gaming system determines when to provide one or more mystery progressive awards to one or more players based on such factors as when a designed amount of wagers are placed at one or more of the gaming devices of the gaming system. That is, these accumulated value progressive awards or N$^{th}$ coin progressive awards are not symbol-driven, but rather are driven by an amount of wagers placed or a suitable coin-in amount. In one embodiment, each progressive award is associated with a range of values, wherein each progressive award will be provided to a player of a gaming device in the gaming system when the progressive award increments to a progressive award hit value within the range of values associated with that progressive award.

For example, as illustrated in FIGS. 1A and 1B, a first accumulated value progressive award 102*a* is associated with a value range of $1 to $10, a second accumulated value progressive award 102*b* is associated with a value range of $10 to $100, a third accumulated value progressive award 102*c* is associated with a value range of $50 to $250 and a fourth accumulated value progressive award 102*d* is associated with a value range of $250 to $1,000. In this example, the first accumulated value progressive award will be provided to a player when the value of the first accumulated value progressive award is in the range of $1 to $10; and the second accumulated value progressive award will be provided to a player when the value of the second accumulated value progressive award is in the range of $10 to $100. Additionally, the third accumulated value progressive award will be provided to a player when the value of the third progressive award is in the range of $50 to $250 and the fourth accumulated value progressive award will be provided to a player when the value of the fourth accumulated value progressive award is in the range of $250 to $1,000. It should be appreciated that maintaining a plurality of progressive awards provides for more frequent progressive awards which breaks up the relatively long periods of time it often takes to build the progressives to the appropriate levels. Providing a plurality of different progressive awards which are triggered or hit at different times results in always or almost always having at least progressive award available that is incremented to desirable levels.

In one embodiment, a plurality of the progressive awards are associated with different value ranges. In another embodiment, each of the progressive awards is associated with a different value range. In another embodiment, a plurality of the progressive awards are associated with the same value range. In this embodiment, the amount which each accumulated value progressive award may increment to is capped or limited by the highest value in the value range associated with such accumulated value progressive award. That is, since each accumulated value progressive must be provided to a player when the value of that accumulated value progressive reaches the progressive hit value, these accumulated value progressives are guaranteed to be provided to the players of the gaming devices in the gaming system. In other words, because these accumulated value progressives are capped at a specified value, they will tend to hit more frequently. In one embodiment, such accumulated value progressive awards are maintained by the central controller and adapted to be provided to any of the gaming machines in the gaming system. In another embodiment, such accumulated value progressive awards are maintained by each individual gaming machine and adapted to be provided to a player of that individual gaming machine. In another embodiment, one or more of such accumulated value progressive awards are maintained by the central controller and one or more of such accumulated value progressive awards are maintained by each individual gaming machine.

Figure 3A:
FIGS. 3A, 3B, 3C and 3D are front-side perspective views of one embodiment of the gaming device disclosed herein illustrating a plurality of progressive awards provided to a player during a free spin secondary game.

In different embodiments, the progressive award hit value at which an accumulated value progressive award is provided to one of the players is predetermined, randomly determined, determined based on the wagers placed in the gaming system, determined based on the status of one or more players (such as determined through a player tracking system), determined based on time, or determined based on any other suitable method. For example, if the progressive hit value of $7.26 is selected as the predetermined progressive hit value for the first accumulated value progressive award, then when the first accumulated value progressive award increases to $7.26, a triggering event will occur and the first accumulated value progressive award will be provided to a player. After the first accumulated value progressive award is provided to a player, the first accumulated value progressive award is reset to a default value and starts incrementing from the default progressive award level. It should be appreciated that although the first accumulated value progressive award is reset to an appropriate progressive award level, none of the remaining progressive awards are reset or otherwise affected by the triggering of the first accumulated value progressive award. As illustrated in FIG. 3A, appropriate messages such as "CONGRATULATIONS, YOU WON THE FIRST ACCUMULATED VALUE PROGRESSIVE AWARD CURRENTLY VALUED AT $7.26" may be provided to the player visually, or through suitable audio or audiovisual displays.

In one embodiment, the first accumulated value progressive award is provided to the player whose coin-in caused the first accumulated value progressive award to increment to its predetermined progressive hit value of $7.26. In different embodiments, the coin-in is determined in any suitable manner, such as by calculating which coin-in will cause the value to change to $7.26, by monitoring the coins-in versus the progressive award value or by calculating the coin-in value in advance based on the wagers, the progressive award hit value, and the percentage of the wagers allocated to the progressive award. For example, on a $1 wager with 0.1% allocated to the first accumulated value progressive award which hits at $7.26, the 7,260$^{th}$ coin wagered (if the casino chooses to start the progressive award at zero) results in the first accumulated value progressive award reaching its predetermined progressive hit value (and thus providing the first accumulated value progressive award to a player).

In one embodiment, if the casino chooses to start the progressive award at a higher level to attract more players, this coin-in value is adjusted to account for the initial starting value. For example, the calculation would subtract 10,000 coins from the coin-in value if the progressive award starts at $10.00. Additionally, in one embodiment, instead of calculating the coin-in for a predetermined progressive award hit value, the gaming machine uses the range information, the hit values and the wagers placed to determine a range of coin-in values which satisfy the parameters for that accumulated value progressive award. In this embodiment, the gaming system determines that an accumulated value progressive award that hits between $10 and $100 requires between 10,000 and 100,000 coins-in. In another embodiment, the gaming system chooses an appropriate coin-in hit value in any suitable manner. For example, the system randomly chooses the coin-in hit value, chooses the coin-in hit value based on a weighted parameter, chooses the coin-in hit value based upon a determined subset range, or chooses the coin-in hit value based on any other suitable manner.

It should be appreciated that due to the different progressive awards being triggered at different times and based on different triggering criteria, a plurality of progressive awards with different default values may overlap in value. That is, a first accumulated value progressive award with a lower default or reset value than a second accumulated value progressive award may, at times, be incremented to a value higher than the second progressive with the higher default value. For example, if a second progressive award has recently been hit and reset to its default value of $100 which is lower than the current value of $165 for the first progressive award (which may not have been triggered for a substantial period of time), then the first progressive award will have a greater value than the second progressive award (even though the second progressive award has a higher default value, increments at a greater frequency and/or increments at a greater percentage of wagers placed than the first progressive award).

In another embodiment, the value range associated with the progressive award a player plays for is based on a player's status (via a player tracking system). For example, a bronze level player may play for a progressive award associated with a value range of $10 to $100, a silver player may play for a progressive award associated with a value range of $200 to $500 and a gold player may play for a progressive award associated with a value range of $1000 to $5000.

In one embodiment, as illustrated in FIGS. 1A and 1B, the plurality of accumulated value progressive awards 102*a* to 102*d* are in a multi-level progressive award (MLP) configuration. In this embodiment, if a triggering event associated with at least one of these progressive awards occurs (i.e., one of the accumulated value progressive awards increments to its respective accumulated value progressive award hit value), a secondary game is triggered. The triggered secondary game enables a player to win one or more progressive awards in addition to the progressive award which incremented to its respective accumulated value progressive award hit value. That is, a player is provided a chance to move up one or more progressive award levels of an MLP, wherein winning any additional progressive award levels is based on the outcome of the secondary game. In one such embodiment, in addition to providing the player the opportunity to win zero, one or more additional accumulated value progressive awards during the play of the secondary game, as described below, the player may also win the progressive award associated with the primary game outcome during the play of the secondary game. Accordingly, the gaming device and gaming system disclosed herein provides a player multiple different ways to win each of a plurality of different types of progressive awards.

As illustrated in FIG. 3A, after the first accumulated value progressive award incremented to its respective accumulated value progressive award hit value of $7.26, the gaming device triggered the secondary game. In one embodiment, the secondary game includes a free spin mode. In the free spin mode, as indicated in block 202 of FIG. 4, the gaming device provides a player a number of free spins or free activations of a plurality of symbol generators, such as reels. As seen in FIG. 3A, the gaming device displays a Free Spins Remaining indicator or meter 108 which informs the player of the number of free spins remaining in the free spin secondary game. In different embodiments, the number of free spins provided to a player are predetermined, randomly determined, determined based on the wagers placed, determined based on the player's status (such as determined through a player tracking system), determined based on time, determined based on which accumulated value progressive award incremented to its respective accumulated value progressive award hit value, determined based on a triggering symbol combination or determined based on any other suitable criteria.

Figure 3B:
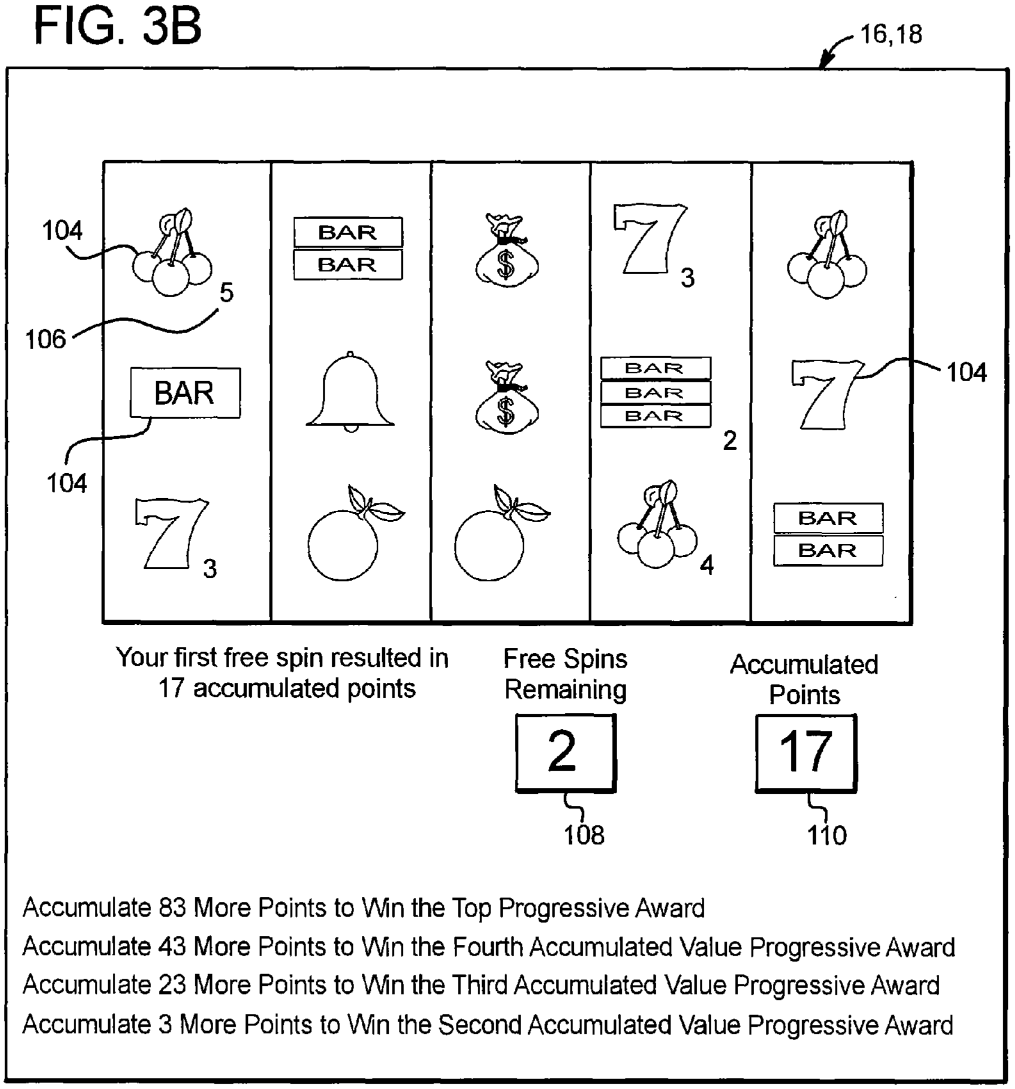

In one embodiment, at least one and preferably a plurality of the symbols 104 in the secondary game each include a secondary symbol 106, such as a sub-symbol (as seen in FIG. 3B). Each secondary symbol includes or is otherwise associated with zero, one or more elements or characteristics, such as a number of points or values. As described below, the elements or characteristics associated with any generated secondary symbols determine which, if any, additional progressive awards to provide to the player. Appropriate messages such as "IN ADDITION TO WINNING THE FIRST ACCUMULATED VALUE PROGRESSIVE AWARD, YOU HAVE WON 3 FREE SPINS TO TRY AND WIN ONE OR MORE ADDITIONAL PROGRESSIVE AWARDS" and "GOOD LUCK" may be provided to the player visually, or through suitable audio or audiovisual displays. In another embodiment, the gaming device does not display to the player the number of points required to be accumulated to win one or more of the available progressive awards.

In one embodiment, one or more of the progressive awards are each associated with a number of secondary symbol characteristics, such as a number of points, which must be accumulated to provide the player that progressive award. As seen in FIG. 3A, the second accumulated value progressive award is associated with twenty accumulated points; the third accumulated value progressive award is associated with forty accumulated points and the fourth accumulated value progressive award is associated with sixty accumulated points. Additionally, the primary game outcome progressive award (illustrated as the "Top Progressive Award") is associated with one-hundred accumulated points. In different embodiments, the number of secondary symbol characteristics associated with each of the progressive awards is predetermined, randomly determined, determined based on the wagers placed, determined based on the player's status (such as determined through a player tracking system), determined based on time, determined based on which accumulated value progressive award incremented to its respective accumulated value progressive award hit value, determined based on a triggering symbol combination or determined based on any other suitable criteria.

Figure 4:
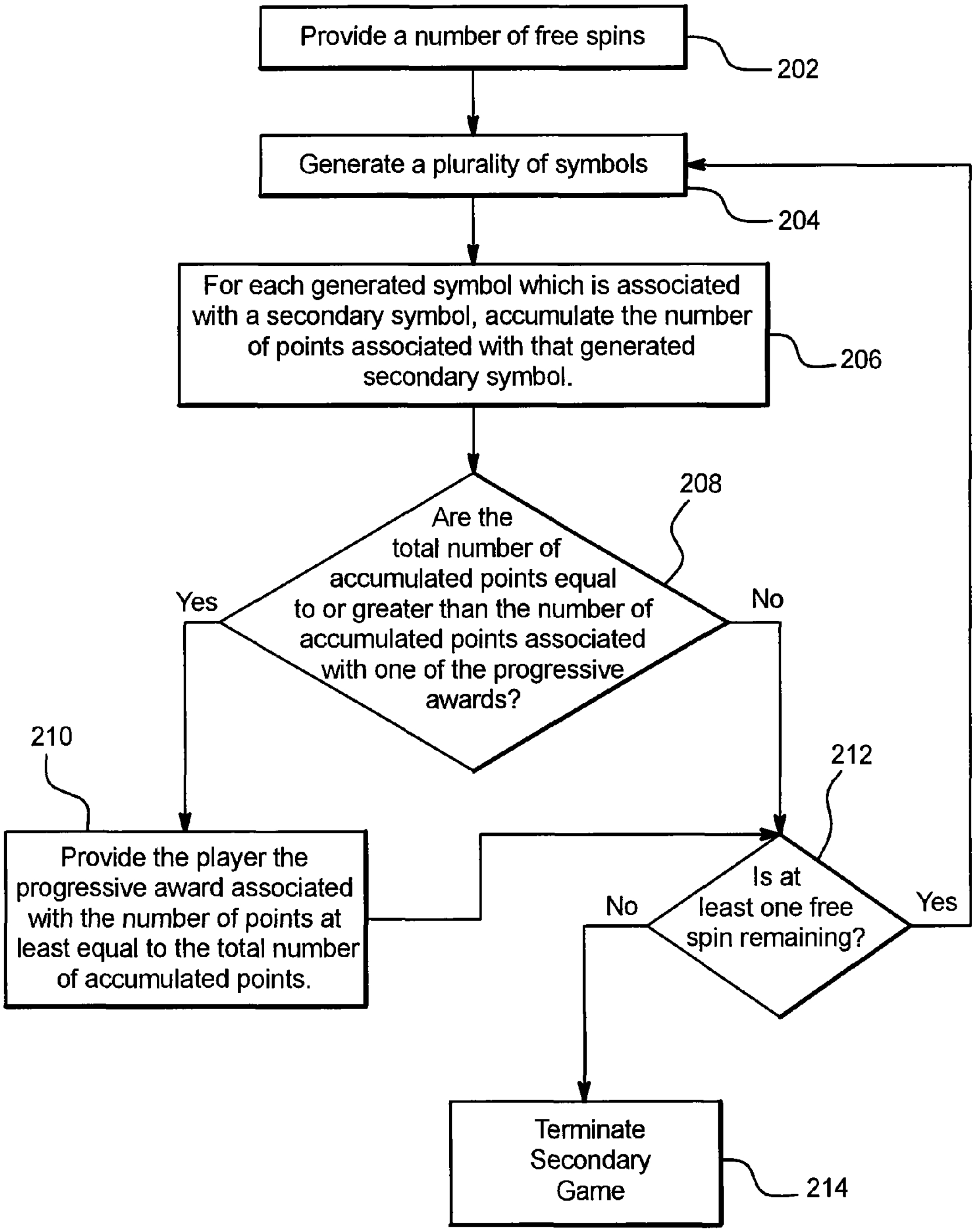
FIG. 4 is a flowchart of one embodiment of the gaming device/gaming system disclosed herein illustrating a play of the free spin secondary game.

As indicated in block 204 of FIG. 4, for each free spin of the secondary game, the gaming device generates a plurality of symbols on the reels. As described above, zero, one or more of the generated symbols include a secondary symbol with an associated number of points. In this case, as seen in FIG. 3B, for the first free spin, the gaming device generates a plurality of symbols and determines that five of the fifteen generated symbols are each associated with a secondary symbol. For example, the cherry symbol generated on the leftmost reel is associated with five points and the seven symbol generated on the leftmost reel is associated with three points.

As indicated in block 206 of FIG. 4, for each generated symbol which is associated with a secondary symbol, the gaming device tracks or accumulates the number of points associated with that generated secondary symbol. In this case, as seen in FIG. 3B, the gaming device accumulates the seventeen total points associated with the five generated secondary symbols. The total number of accumulated points are displayed to the player in an Accumulated Points indicator or meter 110. Appropriate messages such as "YOUR FIRST FREE SPIN RESULTED IN 17 ACCUMULATED POINTS" may be provided to the player visually, or through suitable audio or audiovisual displays.

After accumulating the number of points associated with any generated secondary symbols, as indicated in diamond 208 of FIG. 4, the gaming device determines whether the total number of accumulated points is equal to or greater than the number of accumulated points associated with one of the progressive awards. As described below, if the total number of accumulated points is equal to or greater than the number of accumulated points associated with one of the progressive awards, the gaming device provides the player that progressive award as indicated in block 210. On the other hand, if the total number of accumulated points is not equal to or greater than the number of accumulated points associated with one of the progressive awards, the gaming device does not provide the player any of the available progressive awards. In this case, as seen in FIG. 3B, since the gaming device accumulated seventeen total points and the lowest available progressive award (i.e., the second accumulated value progressive award) is associated with twenty points, the gaming device determines that the player's total accumulated points is not equal to or greater than the number of points associated with any of the available progressive awards. Accordingly, the player is not provided any additional progressive awards for the first free spin of the triggered secondary game.

In one embodiment, the gaming device displays to the player the number of additional points which need to be accumulated for the player to win each of the available progressive awards. In another embodiment, the gaming device displays to the player the number of additional points which need to be accumulated for the player to win some, but not all of the available progressive awards. In another embodiment, the gaming device does not display to the player the number of additional points which need to be accumulated for the player to win one or more of the available progressive awards After determining whether to provide the player one or more of the available progressive awards, the gaming device determines whether any free spins remain in the triggered secondary game as indicated in diamond 212. If at least one free spin remains in the secondary game, the gaming device generates another plurality of symbols and proceeds from block 204 as described above. If no free spins remain in the secondary game, the gaming device terminates the secondary game as indicated in block 214.

Figure 3C:
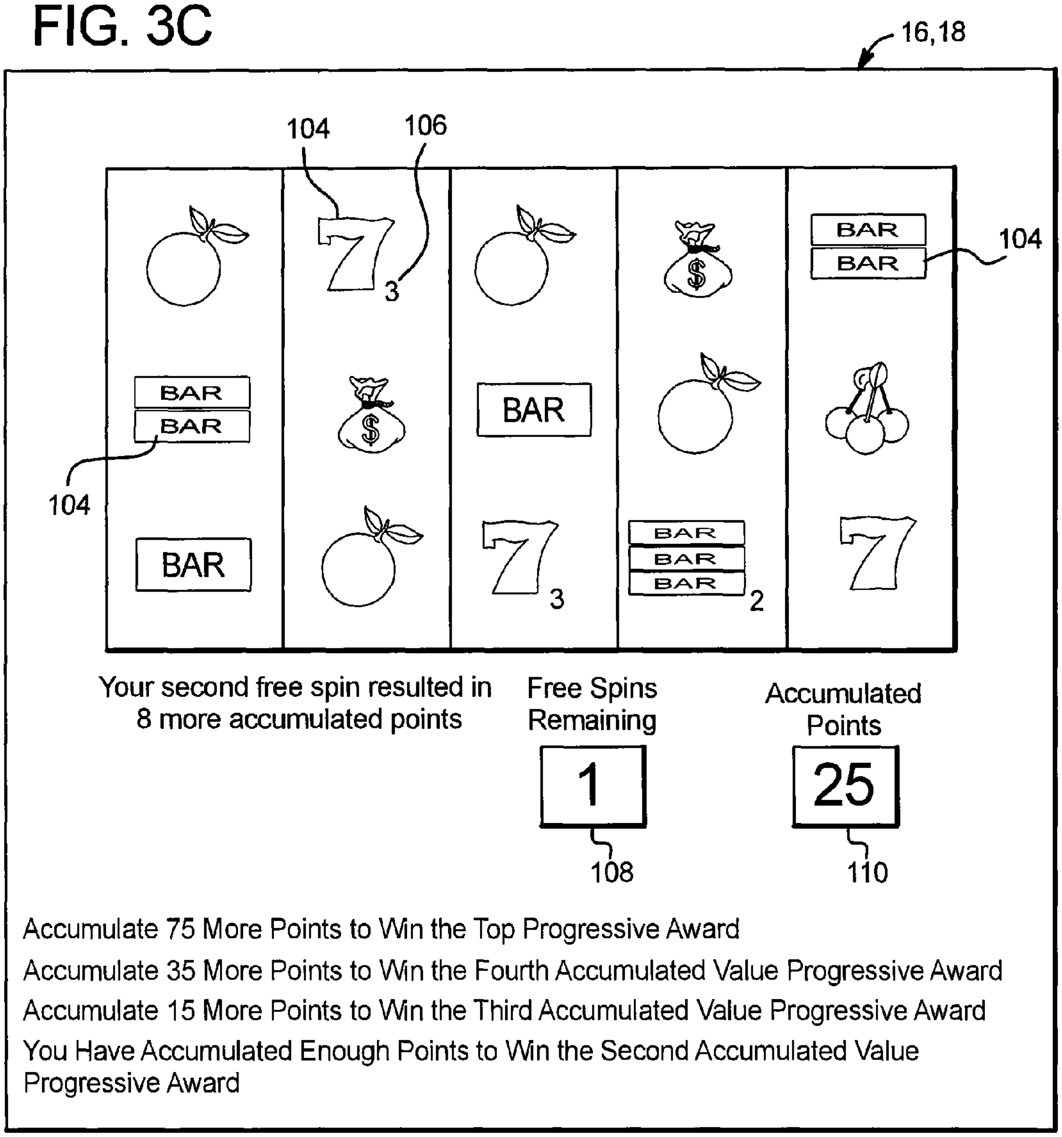

In this case, since two free spins remain, the gaming device generates a plurality of symbols on the reels for the second free spin of the triggered secondary game. As seen in FIG. 3C, the gaming device determines that three of the fifteen generated symbols are each associated with a secondary symbol and the gaming device accumulates the eight total points associated with the three generated secondary symbols. The seventeen points accumulated for the first free spin of the secondary game and the eight points accumulated for the second free spin of the secondary game result in twenty-five total points. Accordingly, since twenty accumulated points is the threshold number of points which must be reached for the player to win the second accumulated value progressive award and the player's twenty-five accumulated points exceed this threshold, the player is provided the second accumulated value progressive award. Appropriate messages such as "YOUR SECOND FREE SPIN RESULTED IN 8 MORE ACCUMULATED POINTS" and "YOU HAVE ACCUMULATED ENOUGH POINTS TO WIN THE SECOND ACCUMULATED VALUE PROGRESSIVE AWARD" may be provided to the player visually, or through suitable audio or audiovisual displays.

It should be appreciated that in addition to providing the player the opportunity to win zero, one or more accumulated value progressive awards during the play of the secondary game, the player may also win the progressive award associated with the primary game outcome during the play of the secondary game. In this embodiment, if the player wins the fourth accumulated value progressive award (either during the secondary game or via the fourth progressive award incrementing to its respective accumulated value progressive award hit value), the player plays the secondary game for a chance to win the symbol-driven progressive award described above. Accordingly, in this embodiment, the gaming device provides a player the primary game progressive award based on the generation of one or more designated symbols or symbol combinations in the primary game or based on the outcome of a secondary game.

In one embodiment, the odds of winning each progressive award is equated for different triggering events occurring. In one such embodiment, the odds of a player winning a progressive award in a primary game (such as based on the generation of a designated symbol or symbol combination associated with that progressive award) is equal to or substantially equal to the odds of a triggering of the secondary game and the player accumulating enough points in the secondary game to win that progressive award. For example, if the odds of a symbol-driven event occurring and the player winning the symbol-driven progressive award are 1 in 2,000,000, then the odds of 1 in 100 of the player triggering the secondary game combined with the odds of 1 in 20,000 of the player accumulating enough points in the secondary game to win the symbol-driven progressive award also equals 1 in 2,000,000 (i.e., $\frac{1}{100} \times \frac{1}{20{,}000}$). In another embodiment, the odds of winning each progressive award are not equated for different triggering events occurring. For example, in one embodiment, a player has better odds of winning the top progressive award by generating a designated symbol combination in the primary game than accumulating enough points in the secondary game to win the top progressive award.

In one embodiment, the player is provided the second accumulated value progressive award obtained during the secondary game in addition to the first accumulated value progressive award (which was provided to the player based on having incremented to its respective accumulated value progressive award hit value). In another embodiment, any progressive award provided to the player during the secondary game is provided instead of any of the accumulated value progressive awards which triggered the secondary game. In another embodiment, the player is only provided the progressive award associated with the highest achieved level in the secondary game.

Figure 3D:
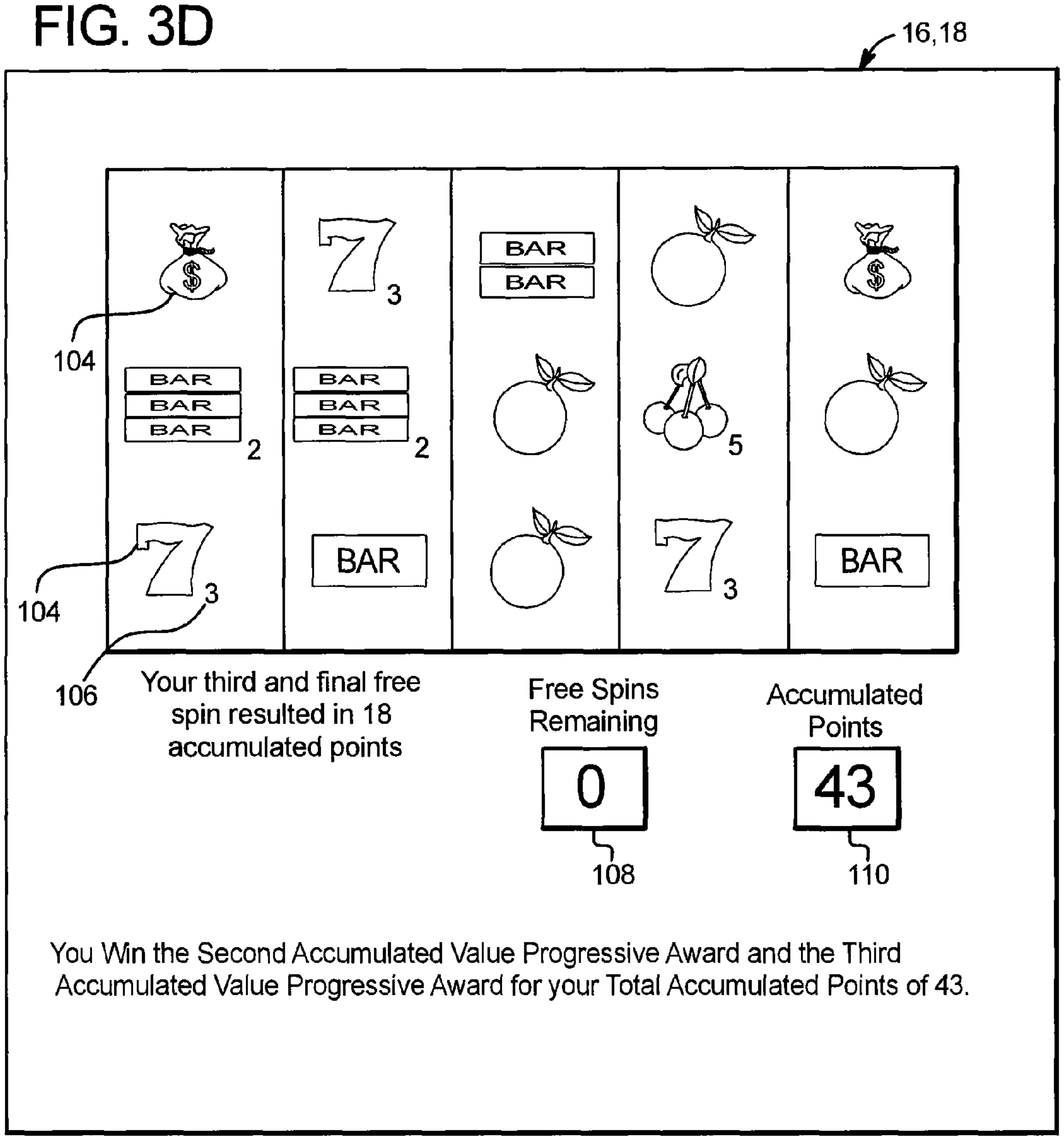

After providing the player the second accumulated value progressive award, the gaming device again determines if at least one free spin remains in the secondary game. In this case, since one free spin remains, the gaming device generates a plurality of symbols on the reels for the third and final free spin of the triggered secondary game. As seen in FIG. 3D, the gaming device determines that six of the fifteen generated symbols are each associated with a secondary symbol and the gaming device accumulates the eighteen total points associated with the six generated secondary symbols. The seventeen points accumulated for the first free spin of the secondary game, the eight points accumulated for the second free spin of the secondary game and the eighteen total points for the third free spin of the secondary game result in forty-three total points. Accordingly, since forty accumulated points is the threshold number of points which must be reached for the player to win the third accumulated value progressive award and the player's forty-three accumulated points exceed this threshold, the player is provided the third accumulated value progressive award. Appropriate messages such as "YOUR THIRD AND FINAL FREE SPIN RESULTED IN 18 ACCUMULATED POINTS" and "YOU WIN THE SECOND ACCUMULATED VALUE PROGRESSIVE AWARD AND THE THIRD ACCUMULATED VALUE PROGRESSIVE AWARD FOR YOUR TOTAL ACCUMULATED POINTS OF 43" may be provided to the player visually, or through suitable audio or audiovisual displays. After providing the player the third accumulated value progressive award, the gaming device determines that no free spins remain. Accordingly, the gaming device terminates the secondary game.

In one alternative embodiment, if one of the progressive awards are provided in the secondary game, the gaming device resets the number of points the player has accumulated to a designated reset value, such as zero. In another such embodiment, if the player has accumulated enough points to win a first of the progressive awards, the gaming device gives the player the option of obtaining the first progressive award (followed by a resetting of the player's accumulated points) or continuing play of the secondary game in hopes of accumulating enough points for the next progressive award. In this embodiment, if the player decides to not take the first progressive award and continue with the secondary game, if the secondary game ends before the player has accumulated enough points for the next progressive award, the gaming device may provide the player the first progressive award, a consolation award or no additional progressive awards.

It should be appreciated that in one embodiment, which progressive award incremented to its respective accumulated value progressive award hit value determines which additional progressive awards the player will play for in the secondary game. For example, as seen in FIGS. 3A to 3D, the lowest progressive award of the MLP (i.e., the first accumulated value progressive award) incremented to its respective accumulated value progressive award hit value, and thus the player played for each of the remaining accumulated value progressive awards as well as the progressive award associated with the play of the primary game. If the progressive award associated with the third accumulated value progressive award had incremented to its respective accumulated value progressive award hit value (not shown), the player would be eligible to play for the fourth accumulated value progressive award and the progressive award associated with the play of the primary game. In another embodiment, which progressive award incremented to its respective accumulated value progressive award hit value does not determine which additional progressive awards the player will pay for in the secondary game.

In another embodiment, which additional progressive awards the player will play for in the secondary game is based on the amount of the player's wager. For example, if the player's wager is in a first range, the player will play for a first set of progressive awards in the secondary game. In this example, if the player's wager is in a second range, the player will play for a second set of progressive awards. In another embodiment, which additional progressive awards the player will play for in the secondary game is based on the player's status (determined via a player tracking system).

Figure 5:
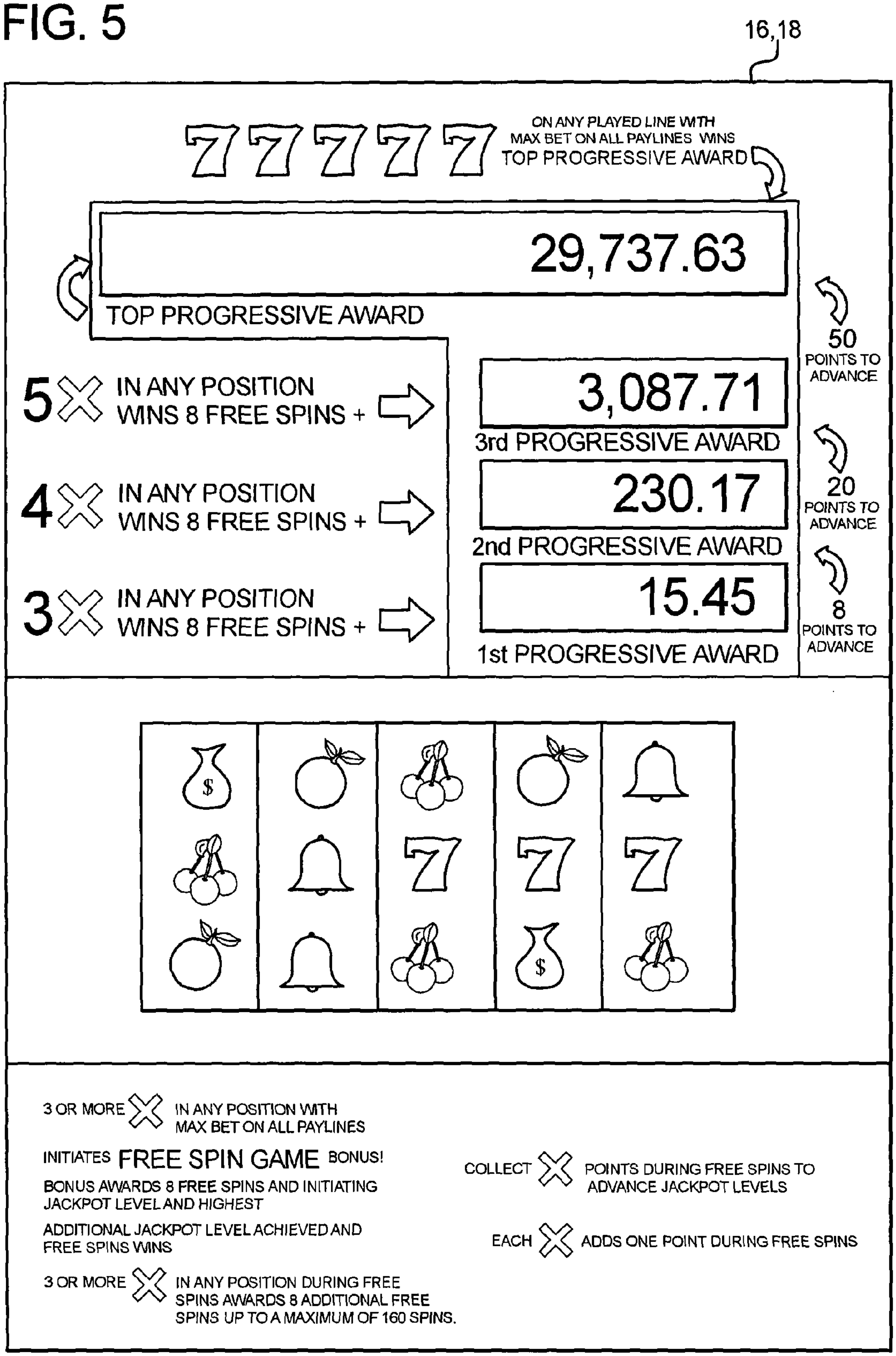
FIG. 5 is a front-side perspective view of an alternative embodiment of the gaming device disclosed herein illustrating a plurality of progressive awards available to be provided to a player in a free spin secondary game.

In another embodiment wherein one or more of the progressive awards are symbol-driven progressive awards and the generation of a designated symbol or symbol combination triggers the secondary game, which additional progressive awards the player will play for in the secondary game is based on the generated symbol or symbol combination. In one such embodiment, the gaming system includes a plurality of triggering symbols (i.e., symbols which trigger the secondary game if generated) wherein which additional progressive awards the player will play for in the secondary game is based on the number of triggering symbols generated. For example, as seen in FIG. 5, if three triggering symbols are generated, the player will play the secondary game to try to advance and win one or more progressive awards from a first set of progressive awards (i.e., the second progressive award, the third progressive award and the top progressive award). In this example, if a four triggering symbols are generated, the player will play the secondary game to try to advance and win one or more progressive awards from a second set of progressive awards (i.e., the third progressive award and the top progressive award).

In an alternative embodiment, the secondary game includes a retrigger feature. In this embodiment, the generation of a designated number of triggering symbols during the free spin secondary game causes a retriggering of the secondary game. In different embodiments, the number of free spins provided to the player upon the retriggering of the free spin game is predetermined, randomly determined, determined based on the wagers placed, determined based on the player's status (such as determined through a player tracking system), determined based on time, determined based on which accumulated value progressive award incremented to its respective accumulated value progressive award hit value, determined based on a triggering symbol combination or determined based on any other suitable criteria. In another embodiment, if the secondary game is retriggered, the gaming device enables the player to play for the progressive award associated with the retriggered secondary game. For example, if the generation of three designated symbols triggers the secondary game (wherein the player is accumulating points to advance to win the second progressive award) and a retriggering event occurs, wherein the retriggering event includes the generation of four designated symbols (which is associated with winning the second progressive award and playing for the third progressive award), then the player automatically advances and accumulates points toward the third progressive award.

In one embodiment, a plurality of or each of the secondary symbols are the same. In another embodiment, a plurality of or each of the secondary symbols are different. In different embodiments, the number of symbols which include a secondary symbol are predetermined, randomly determined, determined based on the wagers placed, determined based on the player's status (such as determined through a player tracking system), determined based on time, determined based on which accumulated value progressive award incremented to its respective accumulated value progressive award hit value, determined based on a triggering symbol combination or determined based on any other suitable criteria.

In one embodiment, a plurality of the symbol generators each include at least one secondary symbol. In another embodiment, a plurality of the symbol generators each include a plurality of secondary symbols. In another embodiment, each of the symbol generators includes at least one secondary symbol. In another embodiment, each of the symbol generators includes a plurality of secondary symbols. In different embodiments, which symbol generators include which secondary symbols is predetermined, randomly determined, determined based on the wagers placed, determined based on the player's status (such as determined through a player tracking system), determined based on time, determined based on which accumulated value progressive award incremented to its respective accumulated value progressive award hit value, determined based on a triggering symbol combination or determined based on any other suitable criteria. In alternative different embodiment, the location of each secondary symbol is predetermined, randomly determined, determined based on the wagers placed, determined based on the player's status (such as determined through a player tracking system), determined based on time, determined based on which accumulated value progressive award incremented to its respective accumulated value progressive award hit value, determined based on a triggering symbol combination or determined based on any other suitable criteria.

In one embodiment, the elements or characteristics (e.g., number of points) associated with a plurality of or each of the secondary symbols are the same. In another embodiment, the elements or characteristics associated with a plurality of or each of the secondary symbols are different. In different embodiments, the elements associated with one, more or each secondary symbol are predetermined, randomly determined, determined based on the wagers placed, determined based on the player's status (such as determined through a player tracking system), determined based on time, determined based on which accumulated value progressive award incremented to its respective accumulated value progressive award hit value, determined based on a triggering symbol combination or determined based on any other suitable criteria.

In one embodiment, in addition to determining if any of the generated symbols are associated with secondary symbols, the gaming device determines if any combinations of symbols are associated with any awards according to an applicable pay table. In this embodiment, any awards associated with any generated symbol combinations are provided to the player during the play of the secondary game. In one such embodiment, if the symbol combination associated with the symbol-driven progressive award, as described above, are generated during the secondary game, the symbol-driven progressive award is provided to the player.

In one embodiment, the gaming device accumulates the number of points associated with a generated secondary symbol if the secondary symbol is generated on a wagered on payline. In another embodiment, the gaming device accumulates the number of points associated with a generated secondary symbol if the secondary symbol is generated on any payline. In another embodiment, the gaming device accumulates the number of points associated with a generated secondary symbol regardless of if the secondary symbol is generated on a payline.

It should be appreciated that for every play of the game by the player, there are a number of award opportunities available and because of the cyclical nature of the progressives there is a high probability that one will be a desirable prize to play for, thus eliminating jackpot fatigue. In other words, in the gaming system disclosed herein, there is always the chance a player can receive one or more progressive awards for each game played. For example, a player places an appropriate wager wherein: (a) the player's wagered coin-in matches the second accumulated value progressive hit value; (b) the player accumulates enough points in the secondary game to win the third and fourth accumulated value progressive awards; and (c) the player's base game generated an outcome associated with the symbol-driven progressive. Thus, it is possible for the player to win a plurality of different types of progressive awards at once based on a single game play.

In another embodiment, if the secondary game is triggered, the player is provided a predetermined or set number of free spins or activations. In this embodiment, the gaming device enables the player to select which progressive award to play for in the secondary game. That is, the gaming device displays the number of accumulated points needed to obtain each progressive award and enables the player to pick, based on the different numbers of required points, which progressive award to play for. In this embodiment, if player's accumulated points during the secondary game at least equals the number of accumulated points associated with the player's selected progressive award, the player is provided the selected progressive award. However, if the player's accumulated points during the secondary game does not equal or exceed the number of accumulated points associated with the player's selected progressive award, the player is not provided any additional progressive awards for the secondary game. For example, if the player selects to play for the third progressive award, but during the play of the secondary game, the player's accumulated points equals or exceeds the number of accumulated points associated with the second progressive award, but does not equal or exceed the number of accumulated points associated with the third progressive award, the player is not provided any additional progressive awards for the secondary game (even though the player's accumulated points equals or exceeds the number of accumulated points associated with the second progressive award). It should be appreciated that this embodiment enables the player to select their volatility in the secondary game.

In one such embodiment, if the player accumulates enough points to win the progressive award the player selected to play for, and the player also accumulated enough points to win one or more of the non-selected progressive awards, the player still wins each non-selected progressive award. For example, if the player selected to play for the second progressive award and during the play of the secondary game, the player accumulated enough points to win the second progressive award and the third progressive award, the player wins both the second and third progressive awards. In another embodiment, if the player accumulates enough points to win the progressive award the player selected to play for, and the player accumulated enough points to win one or more of the non-selected progressive awards, the player will not win any non-selected progressive awards. For example, if the player selected to play for the second progressive award and during the play of the secondary game, the player accumulated enough points to win the second progressive award and the third progressive award, the player only wins the second progressive award (and not the third progressive award).

In another embodiment, a player accumulates points in the secondary game based on the generation of one or more designated symbols. In one such embodiment, as seen in FIG. 5, each time a designated symbol (illustrated as an "X" symbol) is generated, the player accumulates one or more points. In different embodiments, the number of points associated with each designated symbol is predetermined, randomly determined, determined based on the wagers placed, determined based on the player's status (such as determined through a player tracking system), determined based on time, determined based on a triggering symbol combination or determined based on any other suitable criteria. In one such embodiment, as described above, the player plays the free spin game and accumulates points to advance to and win different progressive awards. For example, if the gaming device generated three designated X symbols during the primary game (to trigger a free spin game with the player beginning at the first progressive award level), then the player must accumulate eight points (i.e., eight designated symbols must be generated in the secondary game) to win the second progressive award and proceed in playing for the third progressive award.

It should be appreciated that any suitable game which enables the player to accumulate a number of points may be implemented as the secondary game in the gaming system disclosed herein. In one alternative embodiment, if the secondary game is triggered, the gaming device displays a plurality of selections. One or more of the selections are each associated with a number of points, wherein the number of points associated with each selection is initially masked from the player. In this embodiment, the gaming device enables the player to pick one or more selections. The player accumulates the number of points associated with each picked selection, wherein any additional progressive awards provided to the player in the secondary game are based on the number of accumulated points. In one such embodiment, the gaming device provides the player a number of picks of the selections. In another embodiment, one or more of the selections are associated with terminator symbols. In this embodiment, if the player picks a selection associated with a terminator symbol, the secondary game ends. In another embodiment, one or more of the selections are associated with winning one of the progressive awards. In this embodiment, if the player picks a selection associated with a progressive award, the gaming device provides the player that progressive award (regardless of if the player has accumulated enough points to win that progressive award).

In another embodiment, a triggering event occurs, one of the progressive awards is provided to a player and a secondary game is triggered (which provides a player the opportunity to win additional progressive awards) based on a predefined variable reaching a defined parameter threshold. For example, a progressive award triggering event occurs when the $50,000^{th}$ player has played a gaming machine associated with one of the progressive awards (ascertained from a player tracking system). In different embodiments, the predefined parameter thresholds include a length of time, a length of time after a certain dollar amount is hit, a wager level threshold for a specific machine (which gaming device is the first to contribute $250,000), a number of gaming machines active, or any other parameter that defines a suitable threshold.

In another embodiment, a triggering event occurs, one of the progressive awards is provided to a player and a secondary game is triggered (which provides a player the opportunity to win additional progressive awards) based on time. In this embodiment, a time is set for when a progressive triggering event will occur. In one embodiment, such a set time is based on historic data. For example, if previous progressives have reached $5 million after approximately sixty-seven days, a progressive award may be set to trigger sixty-seven days from when the progressive award is reset. In one embodiment, a suitable algorithm is implemented to determine the player who wagered at or closest to this time with tie-breaking based on any number of factors (e.g., player tracking history, amount of or recent wagers placed). In this embodiment, the progressive award is provided to the player who the algorithm determined wagered closest to when the progressive award is triggered. In another embodiment, one of the player who wagered during a designated time period is randomly selected and the progressive award is provided to the selected player.

In another embodiment, a triggering event occurs, one of the progressive awards is provided to a player and a secondary game is triggered (which provides a player the opportunity to win additional progressive awards) based upon gaming system operator defined player eligibility parameters stored on a player tracking system (such as via a player tracking card or other suitable manner). For example, a gaming system operator may choose to only enable players of the highest player tracking status to be eligible for a progressive award. In this embodiment, the parameters for eligibility are defined by the gaming system operator based on any suitable criterion. In one embodiment, the central controller/gaming device processor recognizes the player's identification (via the player tracking system) when the player inserts their player tracking card in the gaming machine. The central server/gaming device processor determines the player tracking level of the player and if the current player tracking level defined by the gaming system operator is eligible for the progressive award. In one embodiment, the gaming system operator defines minimum bet levels required for the progressive award based on the player's card level. In this embodiment, different bet amounts are required to be eligible to receive different progressive award levels. In another embodiment, as described above, different side bets or side-wager amounts are required to be eligible to receive different progressive award levels. Once the central controller/gaming device processor determines which players are eligible, any suitable method for awarding the progressive award may be employed.

Another embodiment for determining the winner of one or more of the progressive awards (or for determining if at least one gaming device in the gaming system is provided a chance at winning any additional progressive awards in the secondary game) includes a system determination, wherein the progressive award is provided due to a random selection by the central controller. In one embodiment, the central controller tracks all active gaming machines and the wagers they placed. Each gaming machine has its own entry defining its state as either active or inactive and also defining the values of the wagers from that gaming machine. In one embodiment, active status means that the gaming machine is being actively played by a player and enrolled/inactive status means that the gaming machine is not being actively played by a player. The active status requirements can be based on any suitable number of satisfied criteria or defined in any suitable manner by the implementer of the gaming system. For instance, a play of or wager on the primary game of the gaming machine within a predetermined period of time may be part of the determination of whether that gaming machine is in the active status. Other factors such as: (a) the amount of time between each play of or wager on the primary game of the gaming machine; (b) the amount being wagered on the primary game(s); and (c) the number of plays within a period of time, may also or alternatively be part of the determination of whether a gaming machine is in the active status. On the other hand, inactive status means that the gaming machine is one of the gaming machines in the gaming system, but is not in the active status (i.e., not being actively played by a player according to one or more of the predetermined criteria).

In such one embodiment, based on the gaming machine's state as well as one or more wager pools associated with the gaming machine, the central controller determines which of these gaming machines receives the progressive award. In one embodiment, the gaming machine which has been classified as active the longest since the last triggering event is provided at least one progressive award (and is provided a chance at winning any additional progressive awards in a secondary game). In another embodiment, the determination of the winner of one or more of the progressive awards is based on the relative proportion of gaming/wagering activity at each gaming device in the gaming system. In this embodiment, the player who consistently places a higher wager is more likely to receive one of the progressive awards than a player who consistently places a minimum wager.

In another embodiment, a progressive award is provided (or at least one gaming device in the gaming system is provided a chance at winning any additional progressive awards in the secondary game) by determining if any numbers allotted to a gaming device match a randomly selected number. In this embodiment, upon or prior to each play of each gaming machine, a gaming device selects a random number from a range of numbers and during each primary game, the gaming machine allocates the first N numbers in the range, where N is the number of credits bet by the player in that primary game. At the end of the primary game, the randomly selected number is compared with the numbers allocated to the player and if a match occurs, that particular gaming machine is provided all or part of one of the progressive awards.

In another embodiment, the central controller enables a player at any gaming device in the gaming system to place a side bet or side wager on one or more of the progressive awards maintained by the central controller. In this embodiment, if the progressive award associated with the player's side bet or side wager is triggered, the central controller enables the player to participate in the secondary game to win one or more additional progressive awards as described above. For example, if a player is playing a first gaming device associated with a first progressive award and the player places a side bet or side wager on a second progressive award which is associated with a second gaming device (and not associated with the first gaming device), the player's side bet provides the player a chance of obtaining the second progressive award. In this example, if the second progressive award associated with the player's side bet or side wager is triggered, the central controller enables the player to participate in the secondary game to win one or more additional progressive awards.

In one such embodiment, the central controller enables a player at any gaming device in the gaming system to place a side-bet or side-wager on one or more accumulated value progressive awards maintained by the central controller. In this embodiment, if the player's side-bet caused the accumulated value progressive award to reach that accumulated value progressive award's hit value, the player is provided the accumulated value progressive award. In another such embodiment, the central controller enables a player at any gaming device in the gaming system to place a side-bet or side-wager on one or more symbol-driven progressive awards maintained by the central controller. In this embodiment, if the designated symbol or symbol combination associated with the player's side-bet progressive award is generated, the player is provided the progressive award which the player placed a side-bet on. It should be appreciated that in this embodiment, the gaming system may utilize one or more probability equating sequences to equate for different gaming devices including different odds of generating different symbol combinations. For example, if a player places a side-bet on a symbol driven progressive award (at a different gaming device) associated with odds of 1 in 2,000,000, then a designated symbol or symbol combination with the same 1 in 2,000,000 odds (or a combination of a plurality of designated symbols or symbol combinations which result in the same total probability) must be found on the player's gaming device and associated with the progressive award.

Information Provided to Player

As indicated above, the progressive awards may be provided to the players of the gaming machines with or without explanation or information provided to the player, or alternatively information can be displayed to the player. In one embodiment, suitable information about the progressive awards can be provided to the players through one or more displays on the gaming machines or additional information displays positioned near the gaming machines, such as above a bank of system gaming machines. This information can be used to entertain the player or inform the player that a progressive award triggering event has occurred or will occur. Examples of such information are:

(1) that a progressive award triggering event has occurred;

(2) that a progressive award triggering event will shortly occur (i.e., foreshadowing the providing of a progressive award);

(3) that one or more progressive awards have been provided to one or more players of the system gaming machines;

(4) which gaming machines have won the progressive awards;

(5) the amount of the progressive awards won;

(6) the highest progressive award won;

(7) the lowest progressive award won;

(8) the average progressive award won;

(9) number of games played/total time since the last progressive award was won;

(10) the number of progressive awards won in a designated time period; and

(11) the amount of the progressive awards that can be won;

It should be appreciated that such information can be provided to the players through any suitable audio, audio-visual or visual devices.

In one embodiment, a metering and/or information display device may be used to display information regarding the different accumulated value progressive awards. In this embodiment, by informing the player of the maximum the progressive awards will hit at as well as other pertinent statistics, players will be more likely to feverishly play as the progressive award level approaches this maximum in hopes of winning the prize. If the player does not know what this maximum is, they may have no motivation to stay or play at a faster rate.

In one embodiment, the displayed ranges associated with one or more of the accumulated value progressive awards changes as these accumulated value progressive awards build in value. In this embodiment, as an accumulated value progressive award increases in value, the displayed maximum amount the progressive award will hit by is decreased. For example, during a first time period, the displayed maximum amount the progressive award will hit by is a first value and during a second, subsequent time period, the displayed maximum amount the progressive award will hit by is a second, smaller value. In different embodiments, the displayed maximum is decreased based on an algorithm, based on a randomly determined amount, based on the wagers placed in the gaming system, based on the status of one or more players (such as determined through a player tracking system), based on time, based on the current value of the progressive award or determined based on any other suitable method.

Figure 6:
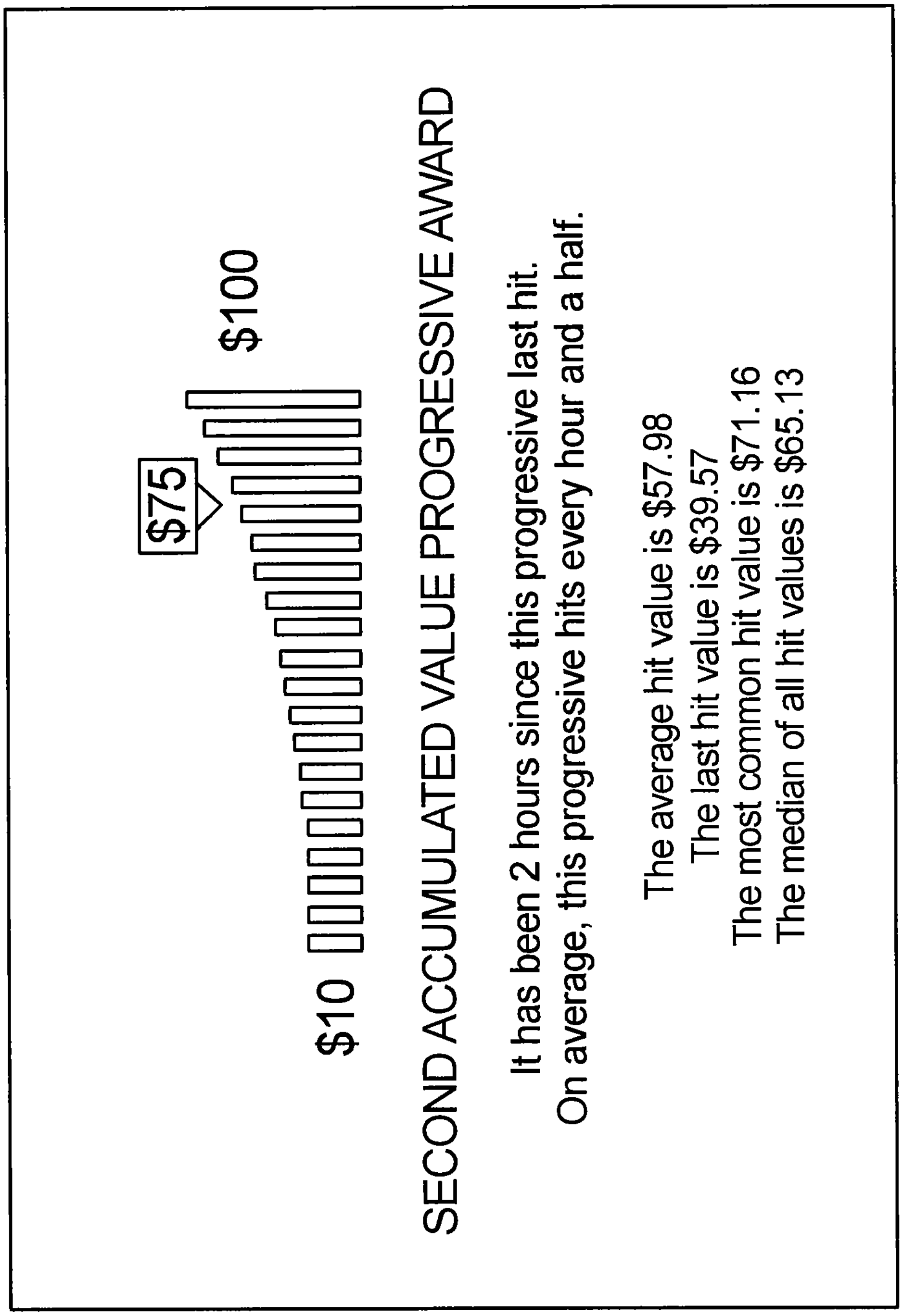
FIG. 6 is a top plan view of a display device of one embodiment of the gaming device disclosed herein illustrating information relating to one of the accumulated value progressive awards.

As seen in FIG. 6, the gaming device utilizes such information and displays to the player information relating to the current state of the second accumulated value progressive award. In one embodiment, such information relates to the time since the progressive award was hit, the average time between progressive awards being hit, the average hit value, the most common hit value and the median of all hit values, and/or any other suitable statistics relating to the current state of this progressive award. In one embodiment, the displayed meter uses color coding and/or different fonts when a particular statistic is in favor of the player (such as the time since the last hit being longer than the average time and the current progressive value is well above the average hit value).

By displaying this information to the player, the player feels they have a slight advantage by "being in the know." Additionally, the player is motivated to play the gaming device in all stages of the game and not just when a progressive award is incremented to a relatively large value. That is, even if the progressive award meter is low, the player is made aware of the most likely hits and the player realizes that, based on the displayed statistics, not every win is a large win. Accordingly, when the progressive meter is at the average value, the player feels the anticipation that the accumulated value progressive award should statistically hit very shortly. Additionally, when the progressive meter is past the average hit value, the player will play feverishly under the assumption the progressive meter most likely will hit at any moment.

Figure 7:
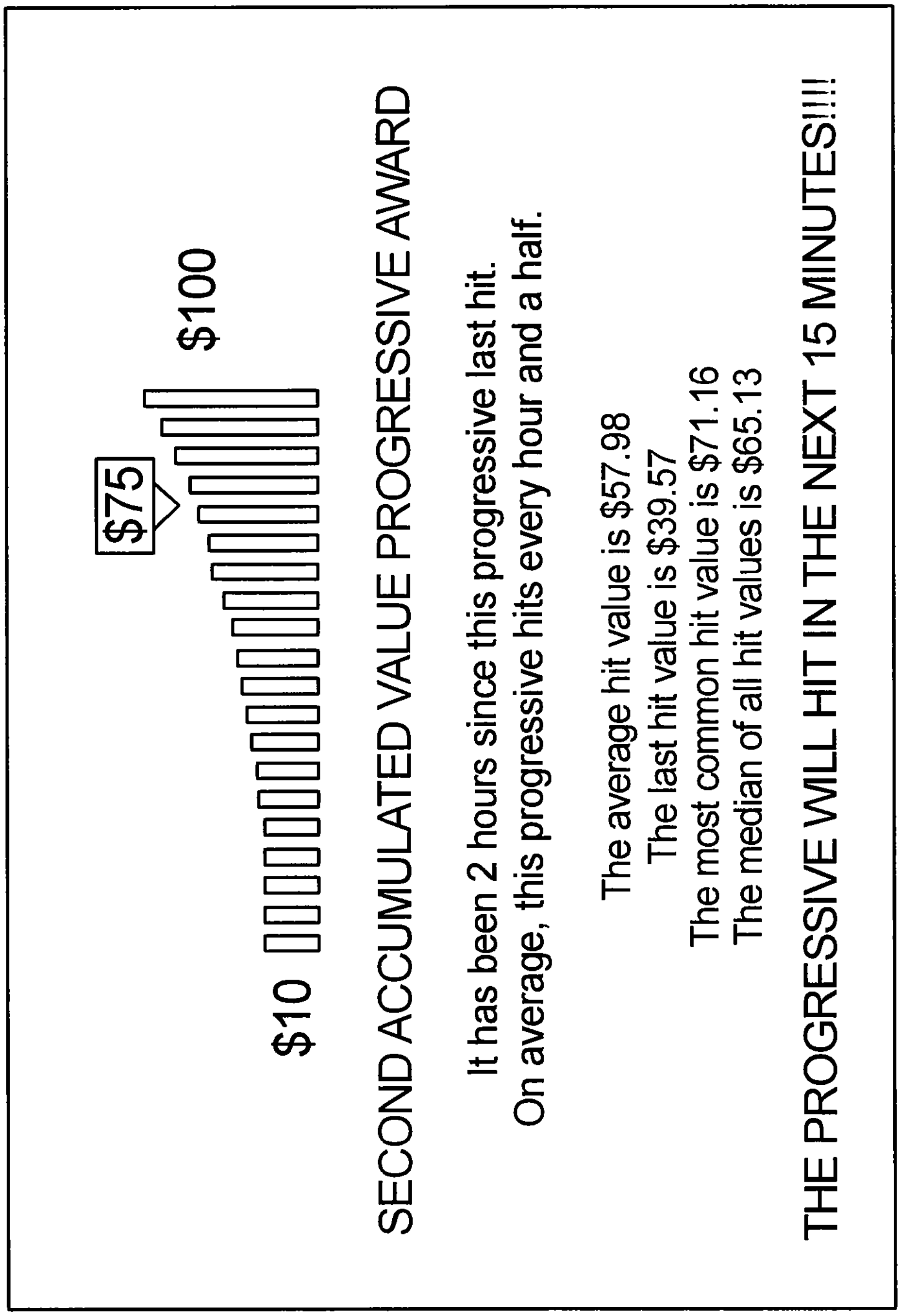
FIG. 7 is a top plan view of a display device of one embodiment of the gaming device disclosed herein illustrating information relating to the gaming system providing one of the accumulated value progressive awards within a designated period of time.
Figure 8:
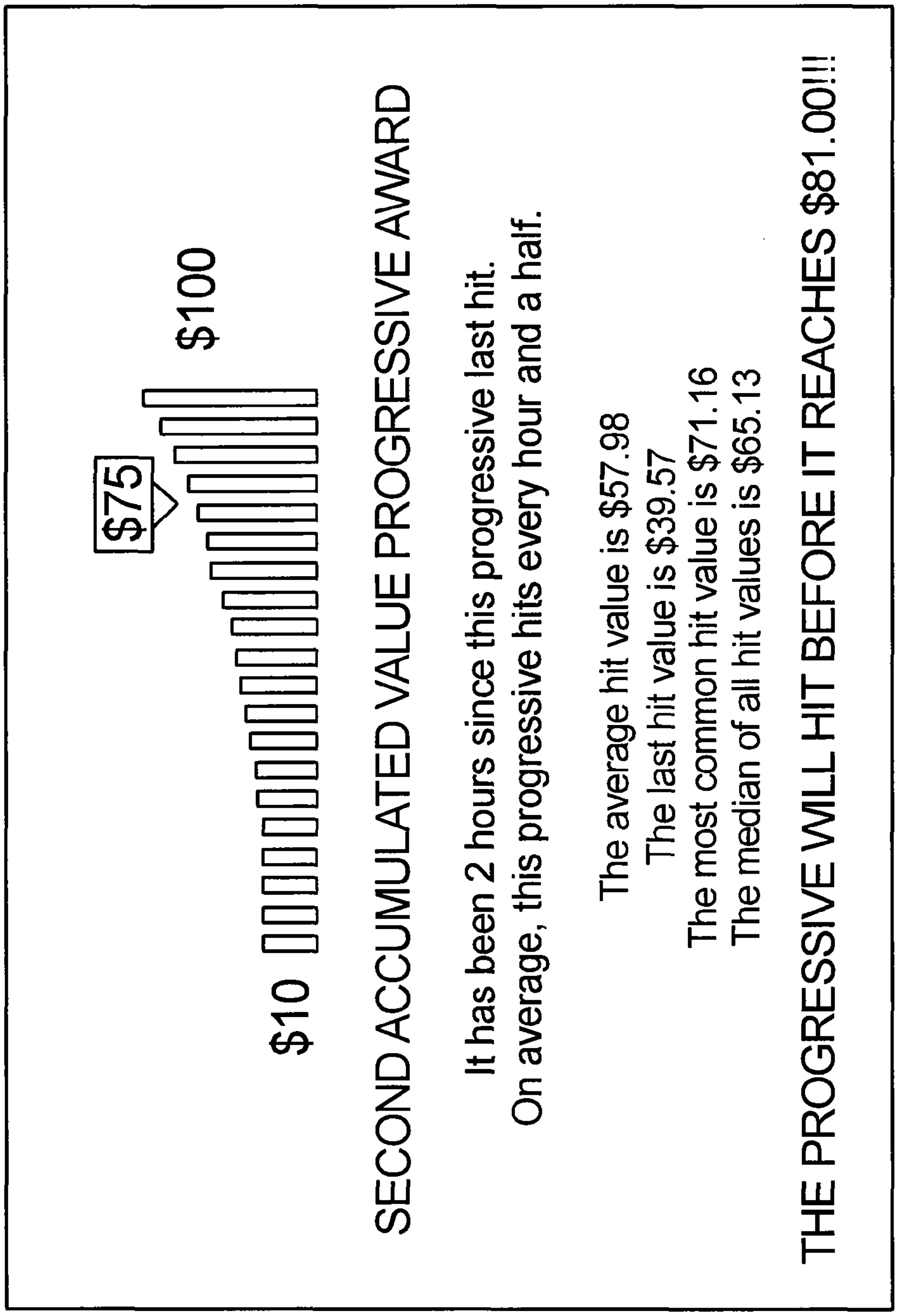
FIG. 8 is a top plan view of a display device of one embodiment of the gaming device disclosed herein illustrating information relating to the gaming system providing one of the accumulated value progressive awards before the progressive award increments to a designated value.

In additional embodiments wherein the controller knows when the progressive award is going to hit based on the selected parameters, the gaming device/gaming system displays additional information to the player regarding the potential, upcoming accumulated value progressive award. As illustrated in FIG. 7, the accumulated value progressive award is determined to hit based on the selected parameter of time and the gaming device displays such information to the player. As seen in FIG. 8, the accumulated value progressive award is determined to hit based on the selected parameter of coins-in and the gaming device displays such information to the player. By giving the player clues or hints as to when the progressive will hit, the player is encouraged to continue playing the gaming device (i.e., motivate the player to stay at the gaming machine if the accumulated value progressive is close to hitting) and will do so at a faster pace if the player knows that the selected winner is based on the coin-in.

In one embodiment, the gaming device displays information relating to one, more or each of the accumulated value progressive awards. Such displayed information provides the player with a wealth of information and the ability to make decisions as to the rate they wish to play. With a plurality of displayed meters offering information to the current status of a plurality of accumulated value progressive awards, the player is provided an increased feeling of excitement about their chances of winning one or more of the progressive awards.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming system comprising:

a plurality of gaming machines, each gaming machine including:

at least one display device;

at least one input device;

at least one processor; and at least one memory device which stores a plurality of instructions, which when executed by the at least one processor, cause the at least one processor to operate with the at least one display device and the at least one input device to:

(a) display a primary game upon a wager, and (b) display a secondary event associated with a secondary event triggering condition; and a controller configured to communicate with the plurality of gaming machines, said controller programmed to:

(a) maintain a designated progressive award, said designated progressive award associated with a first triggering event and a second triggering event, and independent of when said triggering events occur, said second triggering event being different than the first triggering event, and (b) cause one of said gaming machines to provide said designated progressive award to a player of said gaming machine if:

(i) the first triggering event occurs in association with a play of one of the primary games, or (ii) the second triggering event occurs in association with one of the secondary events.

2. The gaming system of claim 1, wherein the designated progressive award is an accumulated value progressive award associated with a range of values and a progressive award hit value.

3. The gaming system of claim 2, wherein the first triggering event occurs if said accumulated value progressive award reaches the progressive award hit value.

4. The gaming system of claim 3, wherein the first triggering event can occur independent of any displayed events in any plays of said primary games.

5. The gaming system of claim 2, wherein the range of values of said accumulated value progressive award defines a minimum value and a maximum value that can be provided to the player.

6. The gaming system of claim 2, wherein the controller is programmed to maintain a second accumulated value progressive award associated with a different second range of values, a different second progressive award hit value and a third triggering event.

7. The gaming system of claim 6, wherein the controller is programmed to cause one of the gaming machines to provide the player of said gaming machine said second accumulated value progressive award if:

(a) said second accumulated value progressive award reaches the second progressive award hit value; or (b) the third triggering event occurs in association with one of the secondary events.

8. The gaming system of claim 6, wherein a determination to provide said second accumulated value progressive award is independent of any displayed events in any plays of said primary games.

9. The gaming system of claim 6, wherein the range of values of said second accumulated value progressive award defines a minimum value and a maximum value that can be provided to the player.

10. The gaming system of claim 6, wherein the controller is programmed to maintain a third progressive award associated with a designated outcome of at least one of the primary games and a fourth triggering event.

11. The gaming system of claim 10, wherein the controller is programmed to cause one of the gaming machines to provide the player of said gaming machine the third progressive award if:

(a) said designated outcome is generated in one of the plays of said primary game; or (b) the fourth triggering event occurs in association with one of the secondary events.

12. The gaming system of claim 1, wherein the designated progressive award is associated with a designated outcome of at least one of the primary games and the first triggering event occurs if said designated outcome is generated in one of the plays of said primary game.

13. The gaming system of claim 12, wherein the controller is programmed to:

maintain a second progressive award associated with a second designated outcome of one of the primary games and a third triggering event; and cause one of the gaming machines to provide the player of said gaming machine the second progressive award if:

(a) said second designated outcome is generated in one of the plays of said primary game; or (b) the third triggering event occurs in association with one of the secondary events.

14. The gaming system of claim 13, wherein the controller is programmed to:

maintain a third progressive award associated with a third designated outcome of at least one of the primary games and a fourth triggering event, and cause one of the gaming machines to provide the player of said gaming machine the third progressive award if:

(a) said third designated outcome is generated in one of the plays of said primary game; or (b) the fourth triggering event occurs in association with one of the secondary events.

15. The gaming system of claim 13, wherein the controller is programmed to:

maintain an accumulated value progressive award associated with a range of values, a progressive award hit value and a fourth triggering event, and cause one of the gaming machines to provide the player of said gaming machine said accumulated value progressive award if:

(a) said accumulated value progressive award reaches the progressive award hit value; or (b) the fourth triggering event occurs in association with one of the secondary events.

16. The gaming system of claim 1, wherein for at least one of the gaming machines:

(1) the primary game is associated with a plurality of reels, wherein each reel includes a plurality of symbols;

(2) the secondary event triggering condition includes a generation of a first designated combination of said symbols;

(3) the secondary event includes a plurality of free activations of said reels, wherein a plurality of said symbols in said secondary event are each associated with at least one point;

(4) the first triggering event includes a generation of a second designated combination of said symbols; and (5) the second triggering event includes an accumulation of a designated number of said points.

17. The gaming system of claim 1, wherein for at least one of the gaming machines:

(1) the primary game is associated with a plurality of reels, wherein each reel includes a plurality of symbols;

(2) the secondary event triggering condition includes the designated progressive award reaching a progressive award hit value;

(3) the secondary event includes a plurality of free activations of said reels, wherein a plurality of said symbols in said secondary event are each associated with at least one point;

(4) the first triggering event includes a generation of a designated combination of said symbols; and (5) the second triggering event includes an accumulation of a designated number of said points.

18. A gaming system comprising:

a plurality of gaming machines, each gaming machine including:

at least one display device;

at least one input device;

at least one processor; and at least one memory device which stores a plurality of instructions, which when executed by the at least one processor, cause the at least one processor to operate with the at least one display device and the at least one input device to:

(a) display a primary game upon a wager, and (b) display a secondary event associated with a secondary event triggering event; and a controller configured to communicate with the plurality of gaming machines, said controller configured to:

(a) maintain a designated progressive award, said designated progressive award associated with a first triggering event and a second triggering event, and independent of when said triggering events occur, said second triggering event being different than said first triggering event, and (b) cause one of the gaming machines to provide said designated progressive award to a player of said gaming machine if:

(i) the first triggering event occurs in association with a play of one of the primary games; or (ii) the secondary event triggering event occurs to trigger the secondary event and the second triggering event occurs in association with the triggered secondary event.

19. The gaming system of claim 18, wherein the designated progressive award is an accumulated value progressive award associated with a range of values and a progressive award hit value.

20. The gaming system of claim 19, wherein the first triggering event occurs if said accumulated value progressive award reaches the progressive award hit value.

21. The gaming system of claim 20, wherein the first triggering event occurs independent of any displayed events in any plays of said primary games.

22. The gaming system of claim 19, wherein the controller is programmed to maintain a second accumulated value progressive award associated with a different second range of values, a different second progressive award hit value and a third triggering event.

23. The gaming system of claim 22, wherein the controller is programmed to cause one of the gaming machines to provide the player of said gaming machine said second accumulated value progressive award if:

(a) said second accumulated value progressive award reaches the second progressive award hit value; or (b) the third triggering event occurs in association with the triggered secondary event.

24. The gaming system of claim 22, wherein a determination to provide said second accumulated value progressive award is independent of any displayed events in any plays of said primary games.

25. The gaming system of claim 22, wherein the controller is programmed to maintain a third progressive award associated with a designated outcome of at least one of the primary games and a fourth triggering event.

26. The gaming system of claim 25, wherein the controller is programmed to cause one of the gaming machines to provide the player of said gaming machine the third progressive award if:

(a) said designated outcome is generated in said primary game; or (b) the fourth triggering event occurs in association with the triggered secondary event.

27. The gaming system of claim 18, wherein the designated progressive award is associated with a designated outcome of at .least one of the primary games and the first triggering event occurs if said designated outcome is generated in said primary game.

28. The gaming system of claim 27, wherein the controller is programmed to:

maintain a second progressive award associated with a second designated outcome of at least one of the primary games and a third triggering event, and cause one of the gaming machines to provide the player of said gaming machine the second progressive award if:

(a) said second designated outcome is generated in said primary game; or (b) the third triggering event occurs in association with the triggered secondary event.

29. The gaming system of claim 28, wherein the controller is programmed to:

maintain a third progressive award associated with a third designated outcome of at least one of the primary games and a fourth triggering event, and cause one of the gaming machines to provide the player of said gaming machine the third progressive award if:

(a) said third designated outcome is generated in said primary game; or (b) the fourth triggering event occurs in association with the triggered secondary event.

30. The gaming system of claim 28, wherein the controller is programmed to:

maintain an accumulated value progressive award associated with a range of values, a progressive award hit value and a fourth triggering event, and cause one of the gaming machines to provide the player of said gaming machine said accumulated value progressive award if:

(a) said accumulated value progressive award reaches the progressive award hit value; or (b) the fourth triggering event occurs in association with the triggered secondary event.

31. The gaming system of claim 18, wherein for at least one of the gaming machines:

(1) the primary game is associated with a plurality of reels, wherein each reel includes a plurality of symbols;

(2) the secondary event triggering event includes a generation of a first designated combination of said symbols;

(3) the secondary event includes a plurality of free activations of said reels, wherein a plurality of said symbols in said secondary event are each associated with at least one point;

(4) the first triggering event includes a generation of a second designated combination of said symbols; and (5) the second triggering event includes an accumulation of a designated number of said points.

32. The gaming system of claim 18, wherein for at least one of the gaming machines:

(1) the primary game is associated with a plurality of reels, wherein each reel includes a plurality of symbols;

(2) the secondary event triggering event includes the designated progressive award reaching a progressive award hit value;

(3) the secondary event includes a plurality of free activations of said reels, wherein a plurality of said symbols in said secondary event are each associated with at least one point;

(4) the first triggering event includes a generation of a designated combination of said symbols; and (5) the second triggering event includes an accumulation of a designated number of said points.

33. A gaming system comprising:

a plurality of gaming machines, each gaming machine including:

at least one display device;

at least one input device;

at least one processor; and at least one memory device which stores a plurality of instructions, which when executed by the at least one processor, cause the at least one processor to operate with the at least one display device and the at least one input device to display a primary game upon a wager placed by a player; and a controller configured to communicate with the plurality of gaming machines, said controller programmed to:

maintain a first accumulated value progressive award associated with a first range of values, and a first progressive award hit value, said first accumulated value progressive award associated with a first triggering event;

maintain a second accumulated value progressive award associated with a different second range of values, a different second progressive award hit value and a first number of accumulated points, said second accumulated value progressive award associated with a second triggering event;

maintain a third progressive award associated with a second number of accumulated points;

if, based on an accumulation of value associated with said first accumulated value progressive award, said first accumulated value progressive award reaches the first progressive award hit value:

(a) cause one of the gaming machines to provide the first accumulated value progressive award to the player of said gaming machine, (b) cause the first triggering event to occur, (c) trigger a first play of a secondary game, and (d) cause the player of said gaming machine to accumulate points in the first play of the triggered secondary game such that:

(i) if the number of accumulated points reaches the first number of accumulated points, the player is provided the second accumulated value progressive award, and (ii) if the number of accumulated points reaches the second number of accumulated points, the player is provided said third progressive award; and if, based on an accumulation of value associated with said second accumulated value progressive award, said second accumulated value progressive award reaches the second progressive award hit value:

(a) cause one of the gaming machines to provide the second accumulated value progressive award to the player of said gaming machine, (b) cause the second triggering event to occur, (c) trigger a second play of the secondary game, and (d) cause the player of said gaming machine to accumulate points in the second play of the triggered secondary game such that if the number of accumulated points reaches the second number of accumulated points, the player is provided said third progressive award.

34. The gaming system of claim 33, wherein the secondary game includes a plurality of symbols, wherein at least one of said symbols is associated with a number of points greater than zero.

35. The gaming device of claim 34, wherein the controller is programmed to determine the number of points associated with each symbol.

36. The gaming system of claim 34, wherein in the secondary game, a plurality of said symbols are generated and any points associated with any generated symbols are accumulated.

37. The gaming device of claim 36, wherein the controller is programmed to control which symbols are generated in the secondary game.

38. The gaming system of claim 33, wherein the secondary game includes a plurality of symbols, wherein at least one of said symbols includes a sub-symbol associated with a number of points greater than zero.

39. The gaming system of claim 38, wherein in the secondary game, a plurality of said symbols are generated and any points associated with any generated sub-symbols are accumulated.

40. The gaming system of claim 33, wherein the second number of accumulated points is greater than the first number of accumulated points.

41. The gaming system of claim 33, wherein the second progressive award hit value is greater than the first progressive award hit value.

42. The gaming system of claim 33, wherein said progressive awards are funded, at least in part, based on the wagers placed on the primary games of the gaming machines.

43. The gaming system of claim 33, wherein the determination that the first triggering event will occur is independent of any displayed events in any plays of any of the primary games of the gaming machines.

44. The gaming system of claim 33, wherein the determination that the second triggering event will occur is independent of any displayed events in any plays of any of the primary games of the gaming machines.

45. The gaming system of claim 33, wherein the ranges of values of said first and second accumulated value progressive awards are associated with the wagers placed.

46. The gaming system of claim 33, wherein the ranges of values of said first and second accumulated value progressive awards each define a minimum value and a maximum value that can be provided to one of the players.

47. The gaming system of claim 33, wherein the third progressive award is associated with a designated outcome of at least one of the primary games.

48. The gaming system of claim 47, which includes a third triggering event associated with the third progressive award, wherein if the designated outcome associated with the third progressive award is generated in said primary game, the third triggering event occurs and the controller is programmed to cause the third progressive award to be provided to one of the players of one of the gaming machines.

49. The gaming system of claim 33, wherein the third progressive award is associated with a third range of values, and a third progressive award hit value, wherein if the third progressive award reaches the third progressive award hit value, the controller is programmed to cause the third progressive award to be provided to one of the players of one of the gaming machines.

50. A gaming system comprising:

a plurality of gaming machines, each gaming machine including:

at least one display device;

at least one input device;

at least one processor; and at least one memory device which stores a plurality of instructions, which when executed by the at least one processor, cause the at least one processor to operate with the at least one display device and the at least one input device to display a primary game upon a wager placed by a player; and a controller configured to communicate with the plurality of gaming machines, said controller programmed to:

maintain a first progressive award associated with a first designated outcome of at least one of the primary games and a first triggering event;

maintain a second progressive award associated with a second designated outcome of at least one of the primary games and a first number of accumulated points, wherein the second designated outcome is different than the first designated outcome and said second progressive award is associated with a second triggering event;

maintain a third progressive award associated with a second number of accumulated points;

if said first designated outcome is generated in the primary game:

(a) cause one of the gaming machines to provide the first progressive award to the player of said gaming machine, (b) cause the first triggering event to occur, (c) trigger a first play of a secondary game, and (d) cause the player of said gaming machine to accumulate points in the first play of the triggered secondary game such that:

(i) if the number of accumulated points reaches the first number of accumulated points, the player is provided the second accumulated value progressive award, and (ii) if the number of accumulated points reaches the second number of accumulated points, the player is provided said third progressive award; and if said second designated outcome is generated in the primary game:

(a) cause one of the gaming machines to provide the second progressive award to the player of said gaming machine, (b) cause the second triggering event to occur, (c) trigger a second play of the secondary game, and (d) cause said gaming machine to provide the player said third progressive award if the number of accumulated points in the second play of the triggered secondary game reaches the second number of accumulated points.

51. The gaming system of claim 50, wherein the secondary game includes a plurality of symbols, wherein at least one of said symbols is associated with a number of points greater than zero.

52. The gaming device of claim 51, wherein the controller is programmed to determine the number of points associated with each symbol.

53. The gaming system of claim 51, wherein in the secondary game, a plurality of said symbols are generated and any points associated with any generated symbols are accumulated.

54. The gaming device of claim 53, wherein the controller is programmed to control which symbols are generated in the secondary game.

55. The gaming system of claim 50, wherein the secondary game includes a plurality of symbols, wherein at least one of said symbols includes a sub-symbol associated with a number of points greater than zero.

56. The gaming system of claim 55, wherein in the secondary game, a plurality of said symbols are generated and any points associated with any generated sub-symbols are accumulated.

57. The gaming system of claim 50, wherein the second number of accumulated points is greater than the first number of accumulated points.

58. The gaming system of claim 50, wherein said progressive awards are funded, at least in part, based on the wagers placed on the primary games of the gaming machines.

59. The gaming system of claim 50, wherein the third progressive award is associated with a designated outcome of at least one of the primary games.

60. The gaming system of claim 59, which includes a third triggering event associated with the third progressive award, wherein if the designated outcome associated with the third progressive award is generated in said primary game, the third triggering event occurs and the controller is programmed to cause the third progressive award to be provided to one of the players of one of the gaming machines.

61. The gaming system of claim 50, wherein the third progressive award is associated with a range of values, and a progressive award hit value, wherein if the third progressive award reaches the progressive award hit value, the controller is programmed to cause the third progressive award to be provided to one of the players of one of the gaming machines.

* * * * *

UNITED STATES PATENT AND TRADEMARK OFFICE

CERTIFICATE OF CORRECTION

PATENT NO. : 8,070,597 B2
APPLICATION NO. : 11/462285
DATED : December 6, 2011
INVENTOR(S) : Ryan W. Cuddy It is certified that error appears in the above-identified patent and that said Letters Patent is hereby corrected as shown below:

In Claim 7, column 42, line 49, before "player" replace "the" with --a--.

In Claim 9, column 42, line 60, before "range" add --second--.

In Claim 11, column 43, line 3, before "player" replace "the" with --a--.

In Claim 13, column 43, line 20, before "player" replace "the" with --a--.

In Claim 14, column 43, line 31, before "player" replace "the" with --a--.

In Claim 15, column 43, line 42, before "player" replace "the" with --a--.

In Claim 23, column 44, line 62, before "player" replace "the" with --a--.

In Claim 26, column 45, line 11, before "player" replace "the" with --a--.

In Claim 27, column 45, line 19, before "least" delete ".".

In Claim 28, column 45, line 27, before "player" replace "the" with --a--.

In Claim 29, column 45, line 38, before "player" replace "the" with --a--.

In Claim 30, column 45, line 49, before "player" replace "the" with --a--.

In Claim 33, column 46, line 34, after "values" delete ",".

In Claim 33, column 46, line 58, before "number" replace "the" with --a--.

In Claim 43, column 47, line 45, after "wherein" replace "the" with --a--.

In Claim 44, column 47, line 49, after "wherein" replace "the" with --a--.

In Claim 49, column 48, line 4, after "values" delete ",".

In Claim 50, column 48, line 48, before "number" replace "the" with --a--.

In Claim 50, column 48, line 50, delete "accumulated value".

Signed and Sealed this
Tenth Day of April, 2012

David J. Kappos

David J. Kappos
*Director of the United States Patent and Trademark Office*